United States Patent
Takada et al.

(10) Patent No.: US 9,752,617 B2
(45) Date of Patent: Sep. 5, 2017

(54) BEARING ASSEMBLY WITH ROTATION SENSOR

(75) Inventors: Seiichi Takada, Kuwana (JP); Hiroyoshi Ito, Kuwana (JP)

(73) Assignee: NTN CORPORATION, Osaka (JP)

( * ) Notice: Subject to any disclaimer, the term of this patent is extended or adjusted under 35 U.S.C. 154(b) by 861 days.

(21) Appl. No.: 13/811,415

(22) PCT Filed: Aug. 23, 2011

(86) PCT No.: PCT/JP2011/068912
§ 371 (c)(1),
(2), (4) Date: Jan. 22, 2013

(87) PCT Pub. No.: WO2012/029586
PCT Pub. Date: Mar. 8, 2012

(65) Prior Publication Data
US 2013/0121629 A1    May 16, 2013

(30) Foreign Application Priority Data

Sep. 3, 2010 (JP) ................................. 2010-197659
Feb. 28, 2011 (JP) ................................. 2011-041513

(51) Int. Cl.
*F16C 41/04* (2006.01)
*F16C 35/06* (2006.01)
(Continued)

(52) U.S. Cl.
CPC .............. *F16C 33/30* (2013.01); *F16C 33/58* (2013.01); *F16C 35/067* (2013.01);
(Continued)

(58) Field of Classification Search
CPC ........ F16C 33/30; F16C 33/58; F16C 41/007; F16C 41/008; F16C 19/06; F16C 19/364; F16C 35/067; G01P 1/026; G01P 3/443
See application file for complete search history.

(56) References Cited

U.S. PATENT DOCUMENTS

| 4,946,296 A | 8/1990 | Olschewski et al. |
| 5,184,069 A * | 2/1993 | Adler et al. ............. 324/207.22 |

(Continued)

FOREIGN PATENT DOCUMENTS

| FR | 2 918 221 | 1/2009 |
| JP | 01-316519 | 12/1989 |

(Continued)

OTHER PUBLICATIONS

Machine Translation of JP 2009036235 A obtained on Aug. 19, 2016.*

(Continued)

*Primary Examiner* — Adam D Rogers
(74) *Attorney, Agent, or Firm* — Wenderoth, Lind & Ponack, L.L.P.

(57) ABSTRACT

An annular sensor holder (5) has an axial end (15) including a protrusion (18). The axial end (15) is fitted in a circumferential groove (7), such as a seal groove, of a bearing race (2) fitted to a stationary member (9) so that the sensor holder (5) can slide in the circumferential direction relative to the bearing race (2). In this state, the sensor holder (5) is coupled to the stationary member (9) by a fixing arrangement (19). Thus, when the bearing race (2) creeps, the sensor holder (5) slides relative to the bearing race (2) and does not rotate relative to the stationary member (9). This prevents breakage of connecting wires.

10 Claims, 18 Drawing Sheets

(51) Int. Cl.
*F16C 33/30* (2006.01)
*G01P 1/02* (2006.01)
*G01P 3/44* (2006.01)
*F16C 33/58* (2006.01)
*F16C 41/00* (2006.01)
*F16C 35/067* (2006.01)
*F16C 19/06* (2006.01)
*F16C 19/36* (2006.01)

(52) U.S. Cl.
CPC ............ *F16C 41/007* (2013.01); *G01P 1/026* (2013.01); *G01P 3/443* (2013.01); *F16C 19/06* (2013.01); *F16C 19/364* (2013.01)

(56) References Cited

U.S. PATENT DOCUMENTS

| | | | | |
|---|---|---|---|---|
| 6,231,241 | B1 * | 5/2001 | Ohkuma | ................ F16C 35/06 324/173 |
| 6,655,844 | B1 * | 12/2003 | Message | ............... F16C 41/007 384/448 |
| 7,290,351 | B2 * | 11/2007 | Niarfeix | ................ G01P 3/443 33/613 |
| 8,368,389 | B2 * | 2/2013 | Itomi | ................ G01D 5/24452 324/202 |
| 8,664,949 | B2 * | 3/2014 | Takei | ....................... G01B 7/30 324/207.25 |
| 8,734,020 | B2 * | 5/2014 | Ito | ....................... F16C 33/7886 384/448 |

| | | | | |
|---|---|---|---|---|
| 2002/0030482 | A1 | | 3/2002 | Iwamoto et al. |
| 2009/0096441 | A1 | | 4/2009 | Masuda |
| 2010/0098362 | A1 * | | 4/2010 | Chaussat ................ F16C 33/80 384/448 |

FOREIGN PATENT DOCUMENTS

| | | | |
|---|---|---|---|
| JP | | 4-74729 | 6/1992 |
| JP | | 05-026233 | 2/1993 |
| JP | | 2000-142341 | 5/2000 |
| JP | | 2002-040037 | 2/2002 |
| JP | | 2002-295465 | 10/2002 |
| JP | | 2004-166355 | 6/2004 |
| JP | | 2007-101357 | 4/2007 |
| JP | | 2008-026329 | 2/2008 |
| JP | | 2008-232318 | 10/2008 |
| JP | | 2008-249037 | 10/2008 |
| JP | | 2009036235 A * | 2/2009 |
| JP | | 2009-074687 | 4/2009 |
| JP | | 2009-092563 | 4/2009 |
| JP | | 2009-156269 | 7/2009 |
| WO | | 2009/004199 | 1/2009 |

OTHER PUBLICATIONS

International Search Report issued Nov. 22, 2011 in International (PCT) Application No. PCT/JP2011/068912.
Written Opinion of the International Searching Authority issued Nov. 22, 2011 in International (PCT) Application No. PCT/JP2011/068912 (with English translation).

* cited by examiner

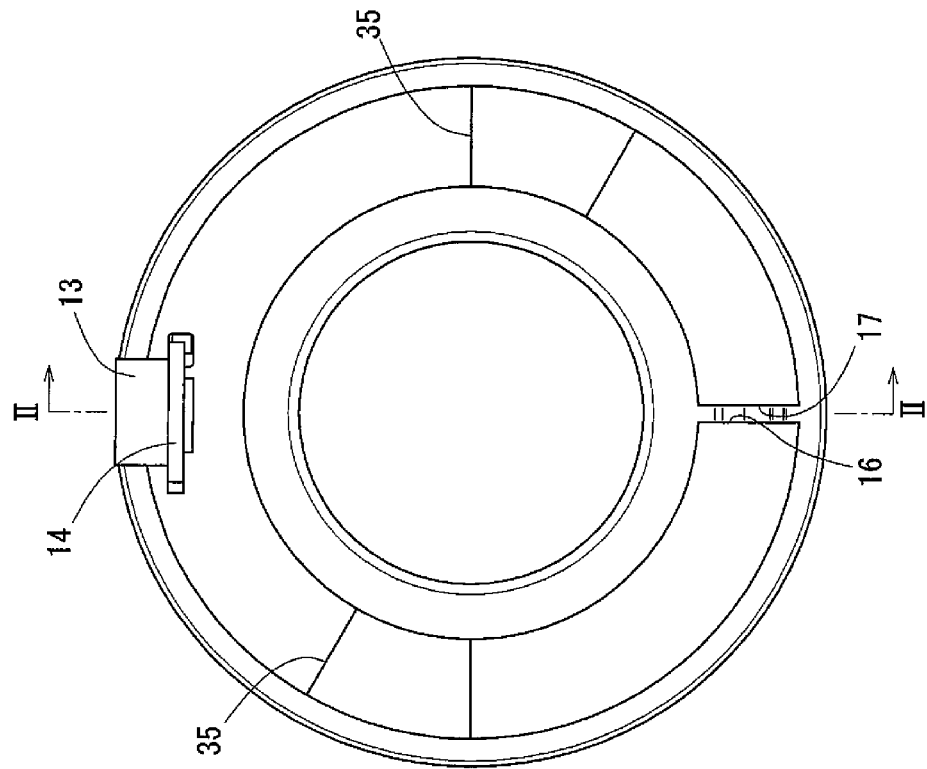
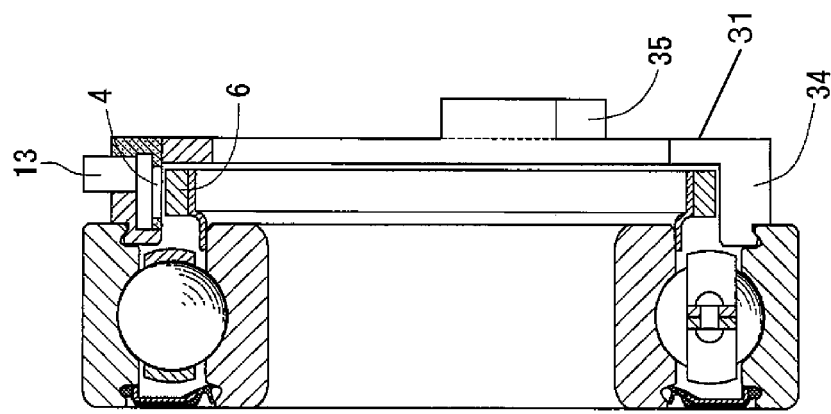

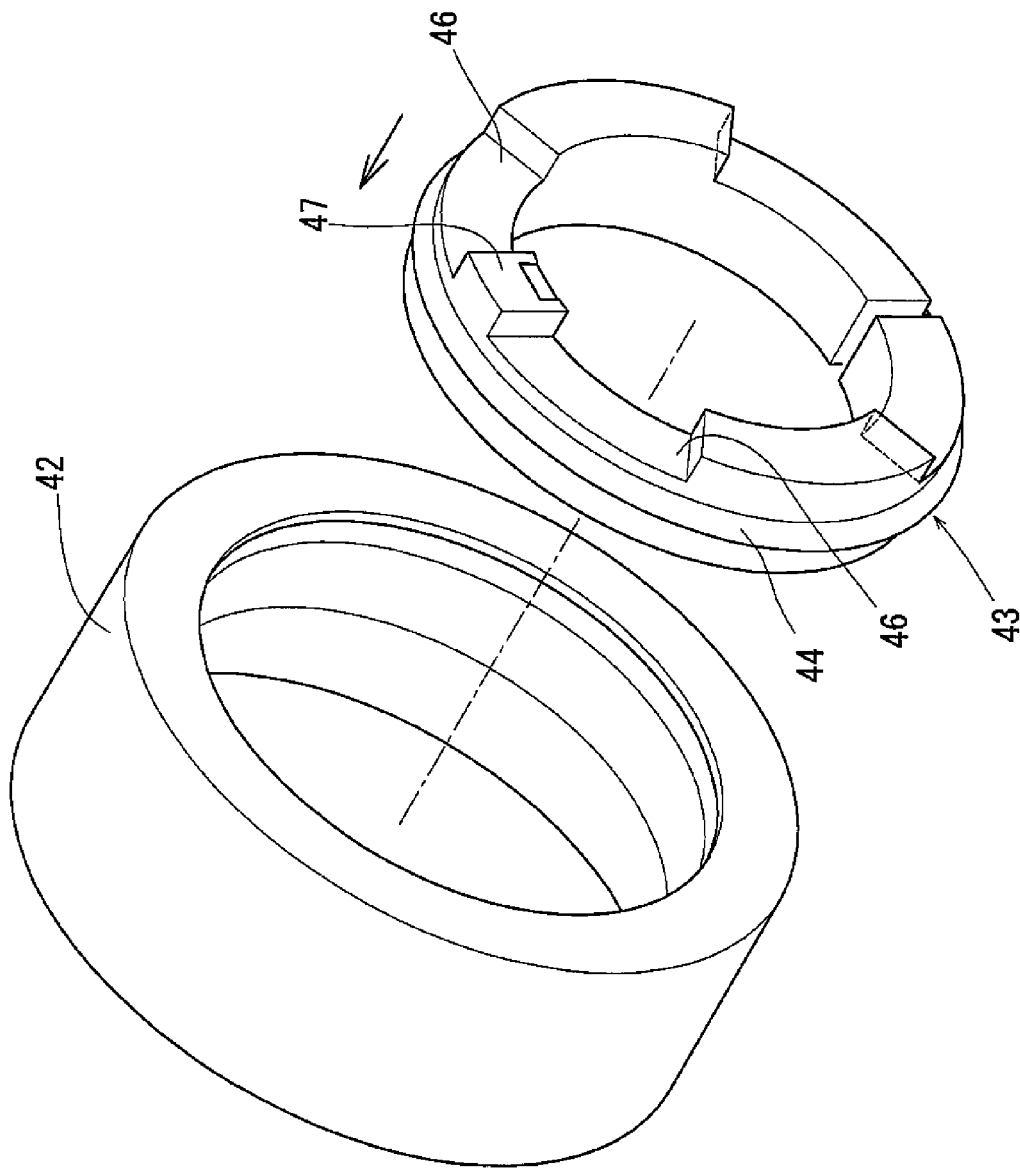

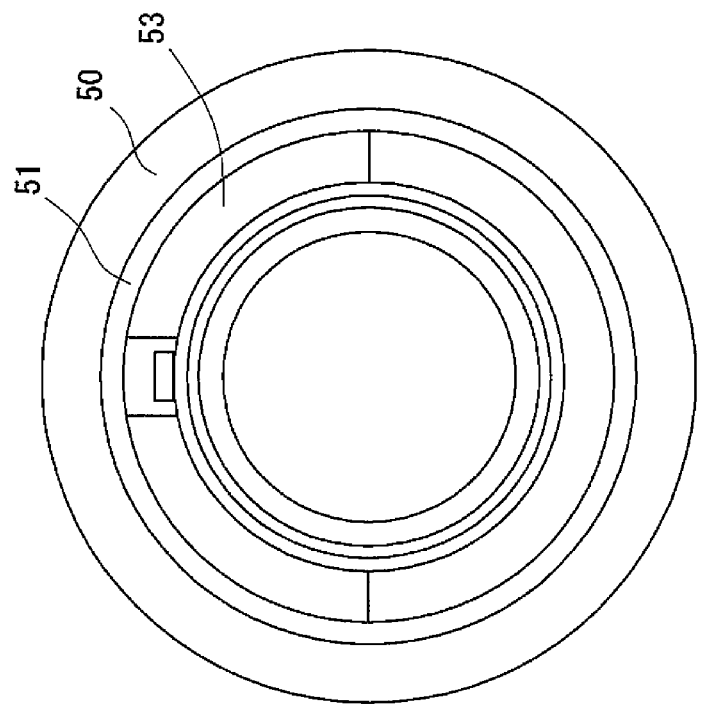
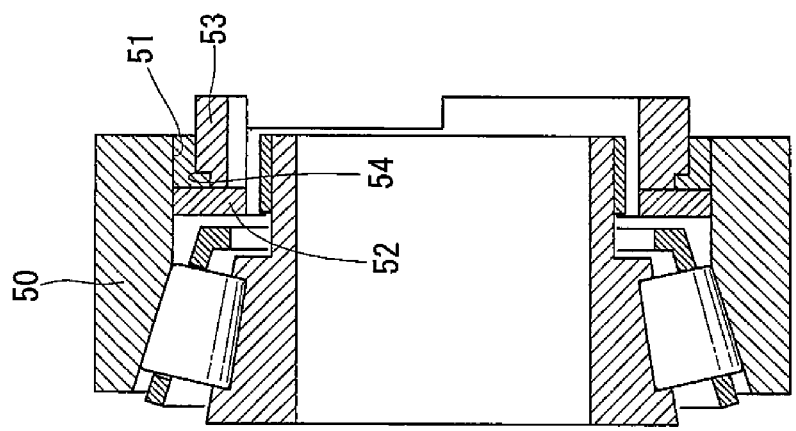

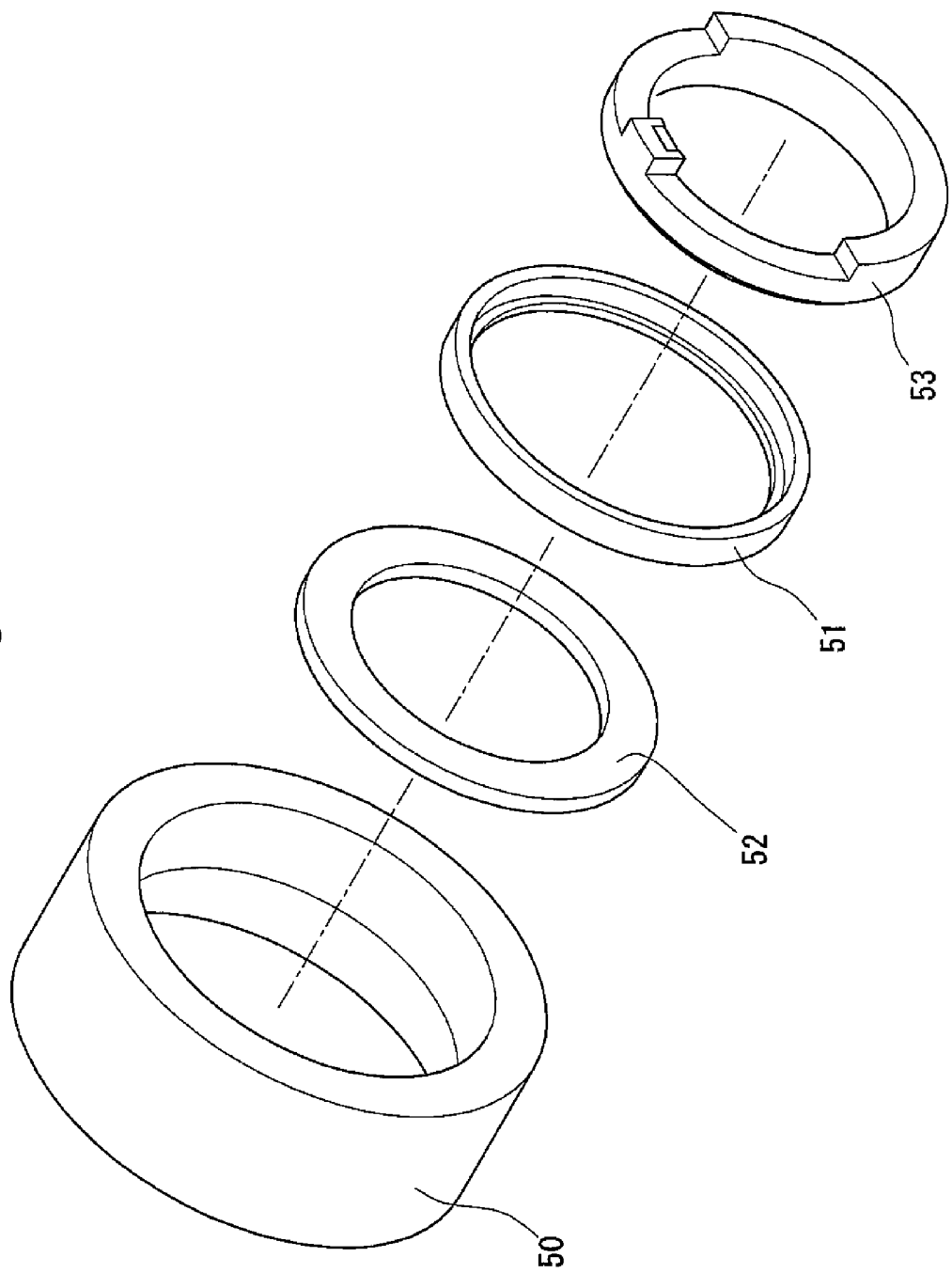

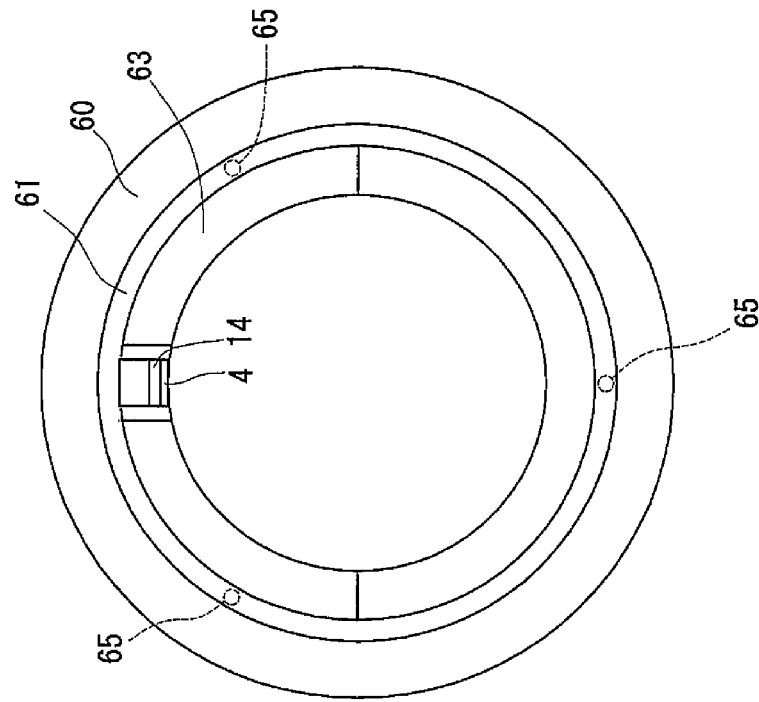
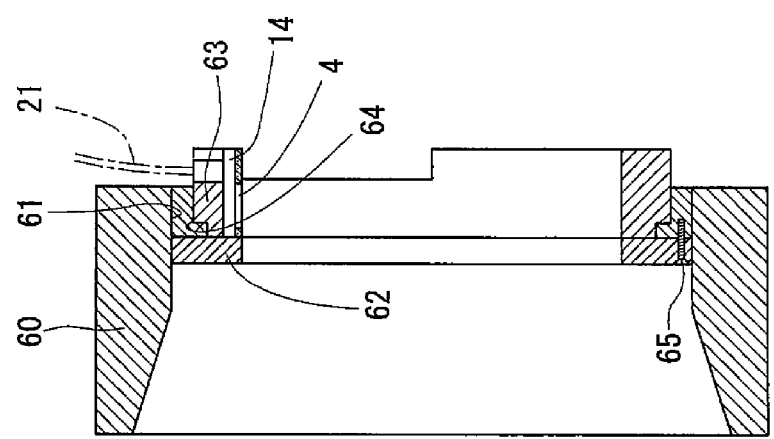

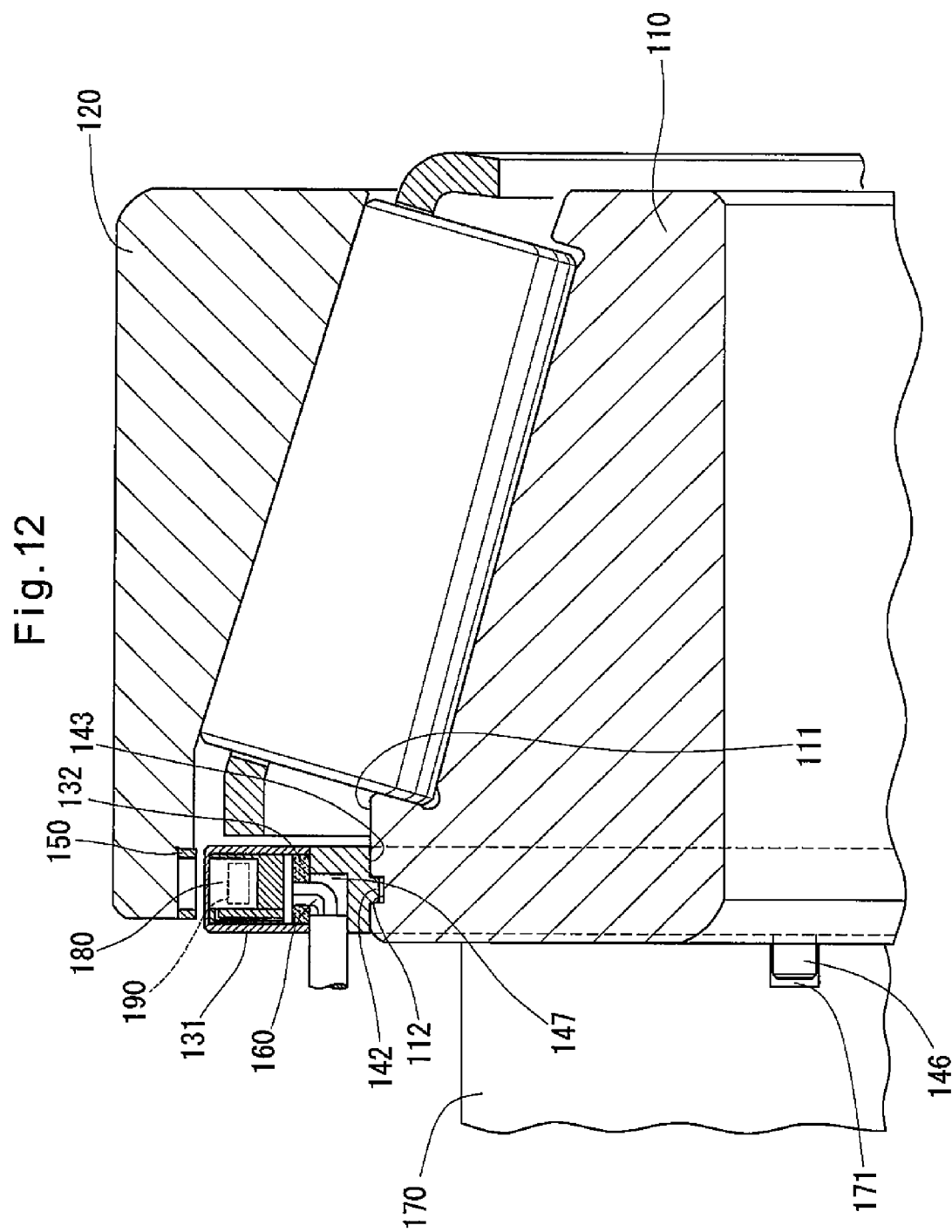

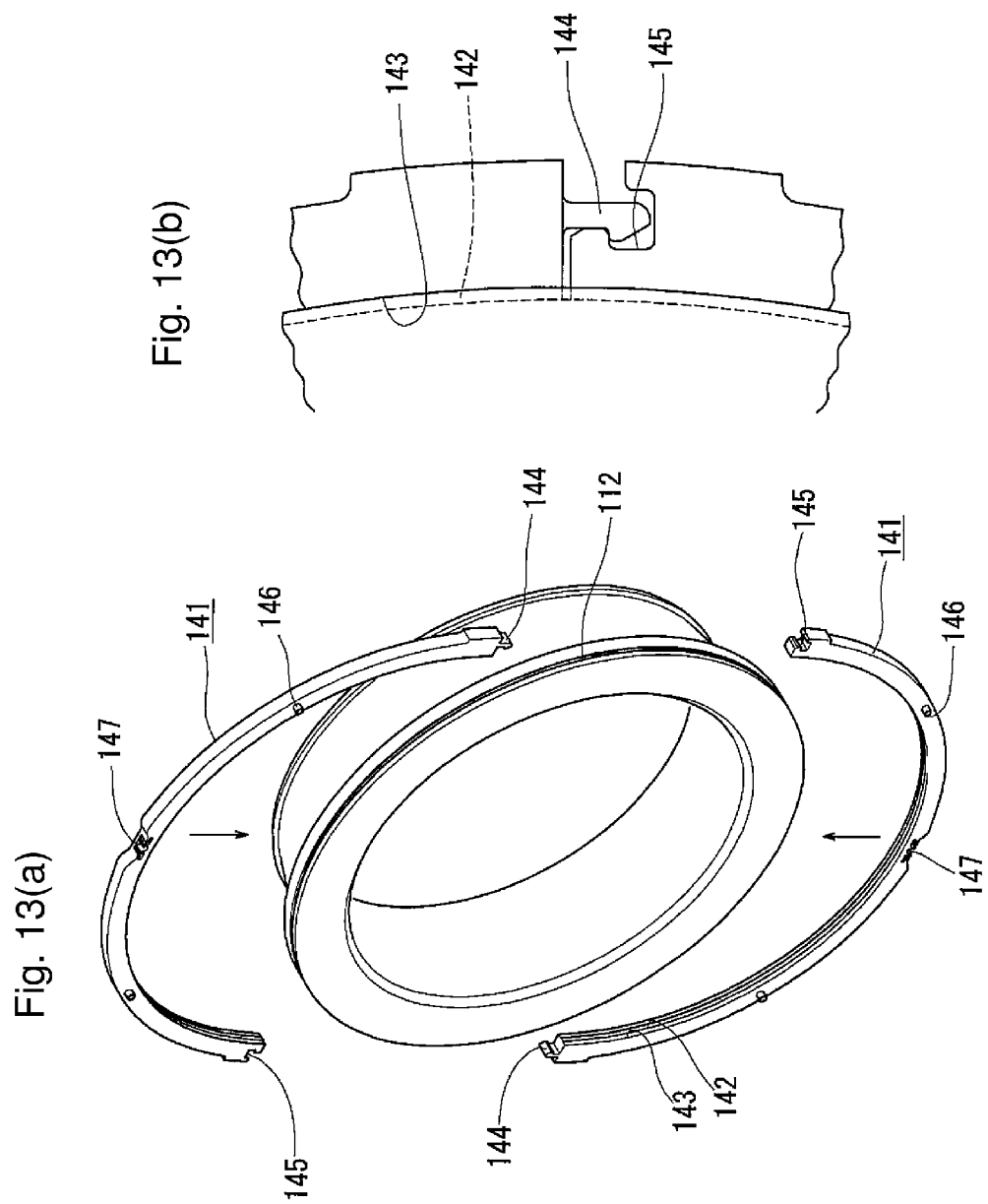

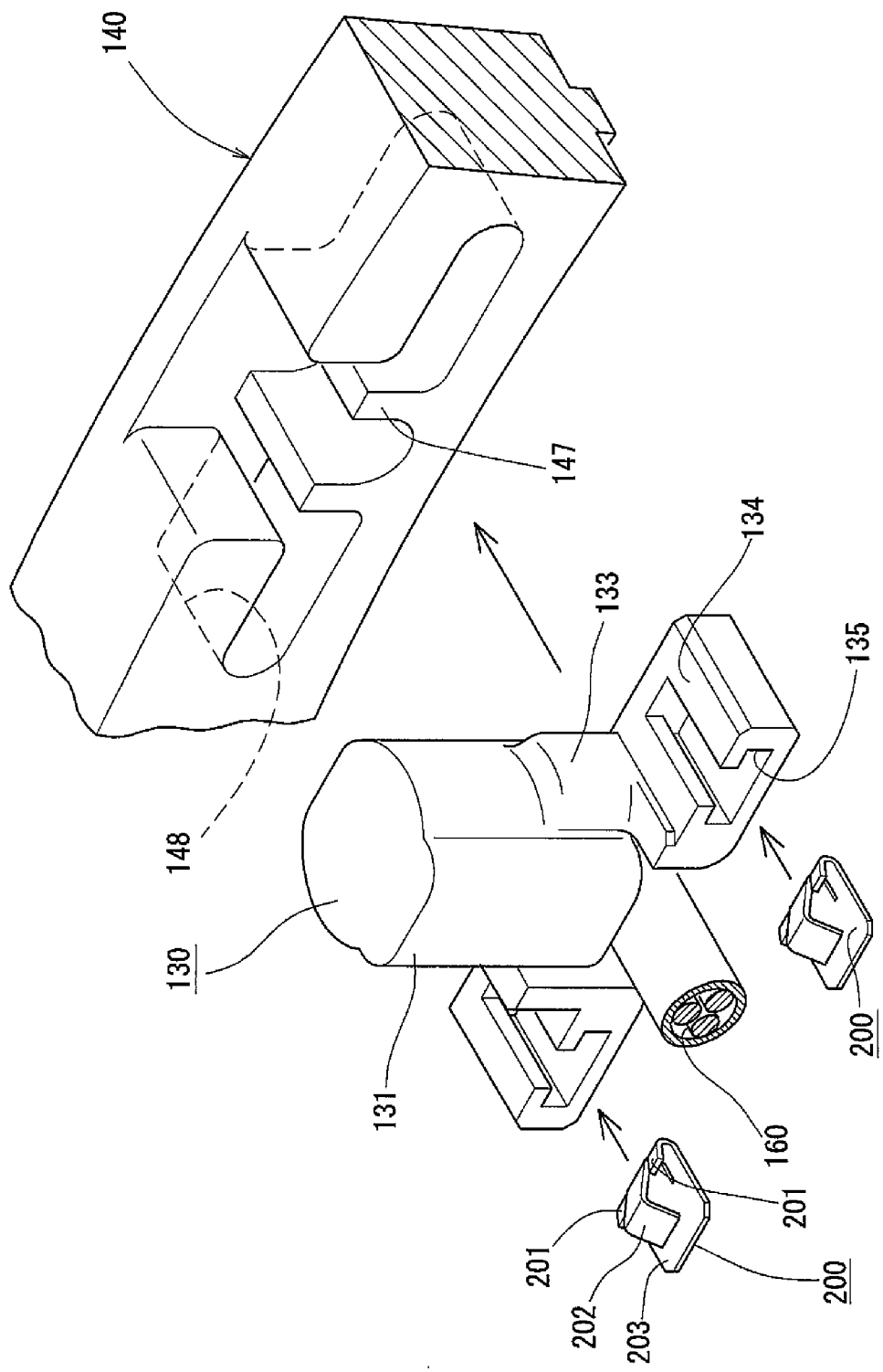

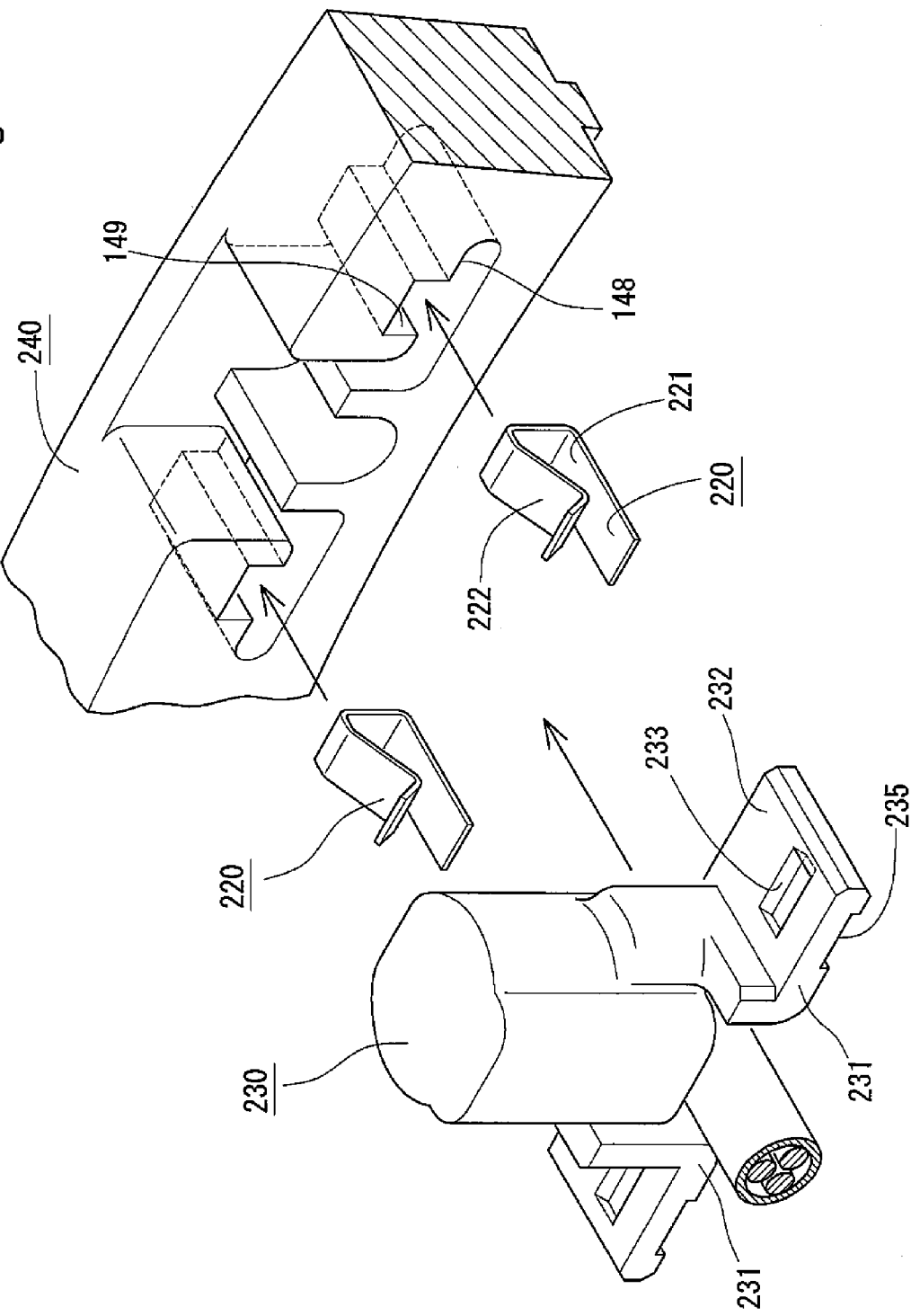

BEARING ASSEMBLY WITH ROTATION SENSOR

TECHNICAL FIELD

This invention relates to a bearing assembly including a rolling bearing and a magnetic rotation sensor.

BACKGROUND ART

Rotation sensors mounted to bearings are used to control rotational speeds, rotational directions, rotation angles, etc., of e.g. motor shafts and vehicle axles. The rolling bearing of such a bearing assembly includes a stationary bearing race fitted to a stationary member such as a motor housing or a suspension of a vehicle, and a rotary bearing race fitted to a rotary member which is rotated about its own axis.

To use this type of bearing assembly, the rolling bearing is mounted between a rotary shaft, such as a motor shaft or a vehicle axle, and a stationary member such as a housing; a magnetic sensor unit is supported on the peripheral surface of the first bearing race fitted to the stationary member that is formed with the raceway; an encoder is mounted to the second bearing race fitted to the rotary shaft so as to rotate in unison with the rotary shaft, forming a predetermined gap between the encoder and the magnetic sensor held by the magnetic sensor unit; and the magnetic sensor is connected to an external device through wires. The encoder converts the rotation of the second bearing race and thus the rotation of the rotary shaft to a change in magnetic which is detected by the magnetic sensor. The detection signal from the magnetic sensor is transmitted to the external device through the wires. The external device uses the detection signal to control the rotational speed, rotational direction, rotation angle, etc., of the rotary shaft.

The sensor holder is supported on the first (stationary) bearing race because the wires and sensor can be easily positioned relative to the first bearing race. The sensor holder is an annular member so that the sensor holder can be fitted to the first bearing race. In particular, the sensor holder, which carries the magnetic sensor, is press-fitted to the first bearing race so as to be fixed to the first bearing race. The encoder, which is rotationally fixed to the second bearing race converts its rotation to a change in magnetic field. The encoder can be easily fixed to the peripheral surface of the second bearing race or another rotary member through a core bar or directly by press-fitting or by means of nuts.

As described above, with the rolling bearing mounted between the stationary member and the rotary member, with the sensor holder mounted to the first bearing race, and with the signal from the magnetic sensor sent to the external device through wires extending outwardly from the sensor holder, detection can be made by the encoder and the magnetic sensor (see e.g. JP Patent Publication 2002-40037A).

One known conventional sensor unit is a sensor holder which is a combination of an annular sensor support body and a sensor case to which the magnetic sensor is fixed. The sensor case insulates and protects the magnetic sensor circuit from outside. The sensor case includes a sensor mounting portion made of a resin and defining an open recess in which the sensor circuit is fixedly mounted. At least the sensor circuit is covered by a protective material such as resin molding or a lid. When the sensor case is inserted into the sensor support body, the sensor support body is configured to guide the sensor case to a fitted position where the magnetic sensor is located in a detecting position.

A conventional such sensor support body is typically in the form of a metal sheet fixed to the peripheral surface of the first bearing race formed with the raceway by press-fitting. Such a sensor support body has an annular sensor case inserting hole open at one axial end of the sensor support body and closed at the other axial end by an end wall. The sensor case has an insert portion adapted to be inserted into the sensor case inserting hole in the axial direction. Before inserting the insert portion into the inserting hole, adhesive is applied to the surface of the insert portion and/or the surface of the inserting hole. When the insert portion is inserted into the inserting hole until the insert portion abuts the end wall, the sensor case is fitted in the sensor support body in the fitted position where the magnetic sensor is located in the detecting position. The sensor support body has a plurality of circumferentially spaced apart bent claws which axially keep the sensor case in the fitted position (see e.g. JP Patent Publication 2002-295465A).

If the first bearing race (i.e. stationary bearing race) is fitted to the stationary member, the stationary bearing race may creep due to the imbalance of the shaft. If creeping is a concern, the stationary bearing race may be fitted to the stationary member by press-fitting.

But if, due to some problems in assembling, the stationary bearing race cannot be press-fitted to the stationary member, the wires, which extend from the sensor holder, could be broken due to creeping of the stationary bearing race. In the arrangement of JP Patent Publication 2002-295465A, when the stationary bearing race creeps, the sensor support body, which is fixed to the stationary bearing race, rotates together with the stationary bearing race. Excessive creep, i.e. rotation, of the stationary bearing race could pull and break the wires connecting the magnetic sensor circuit fixed to the sensor case to the external device, which is a member of a system to which the bearing assembly is mounted.

In JP Patent Publication 2002-295465A, no consideration is given to the possibility of reusing the sensor case after the roller bearing becomes useless due e.g. to creeping of the stationary bearing race or due to natural aging of the bearing. In order to reuse the sensor case of JP Patent Publication 2002-295465A, for example, the sensor case has to be removed from the sensor support body by breaking the adhesive bond therebetween and bending all of the bent claws of the sensor support body. It is thus extremely troublesome to remove the sensor case from the sensor support body. Also, since the guide surface of the sensor case is damaged by the adhesive, it is difficult to combine this sensor case with a new sensor support body.

SUMMARY OF THE INVENTION

A first object of the present invention is to prevent breakage of the wires even if the bearing race to which the sensor holder is mounted creeps. A second object is to provide a bearing assembly with a rotation sensor of which the wires never break due to creeping and of which the sensor case is reusable.

In order to achieve the first object, the present invention provides an arrangement with which the sensor holder can be mounted to one of the inner and outer races so as to be slidable in the circumferential direction of the rolling bearing. If creeping of the one of the inner and outer races during detection is a concern, by rotationally fixing the sensor holder beforehand, if creeping occurs, the sensor holder slides relative to the one of the inner and outer races, and does not rotate relative to the stationary member around the center axis of the rolling bearing. This prevents breakage of the wires.

Specifically, the bearing assembly may further comprise a fixing arrangement through which the sensor holder is coupled to the stationary member such that when fitting surfaces of the stationary member and the one of the inner and outer races rotate relative to each other, the sensor holder slides in the circumferential direction relative to the one of the inner and outer races. If the bearing assembly has to be mounted at a location where the bearing race to which the sensor holder is mounted tends to creep, it is possible to easily prevent rotation of the sensor holder with the fixing arrangement.

The sensor holder may be an endless annular member or an annular member having circumferential opposed ends, provided the sensor holder does not interfere with the detection, can slide in the circumferential direction, and is radially and axially positionable relative to the one of the inner and outer races. The sensor holder may be directly fitted to the one of the inner and outer races, or may be fitted to another member fixed to the one of the inner and outer races.

For example, in one preferred arrangement, the one of the inner and outer races is formed with a circumferential groove extending the entire circumference of the one of the inner and outer races, the sensor holder has two circumferential ends circumferentially facing each other, and the sensor holder has a protrusion at a first axial end of the sensor holder, the protrusion being engageable in the circumferential groove by elastically deforming the sensor holder such that the size of the gap defined between the circumferential ends of the sensor holder changes in the circumferential direction. With this arrangement, since the distance between the circumferential ends of the sensor holder is changeable by elastically deforming the sensor holder, it is possible to change the diameter of the sensor holder at the first axial end such that the protrusion can be easily fitted in the circumferential groove. Once the elastic deformation of the sensor holder is released, the first axial end of the sensor holder, including the protrusion, is pressed against the one of the inner and outer races. Thus, the sensor holder can be radially and axially positioned until the sensor holder is coupled to the stationary member by the fixing arrangement. Since the protrusion is fitted in the circumferential groove, which extends the entire circumference of the bearing race, the sensor holder can slide irrespective of the degree of creeping of the one of the inner and outer races.

For example, in a preferred arrangement, the sensor holder can be coupled to the stationary member by the fixing arrangement at two portions of the sensor holder which are nearer to the respective circumferential ends of the sensor holder such that when the sensor holder is coupled to the stationary member at the two portions, a circumferential distance between the circumferential ends of the sensor is fixed. With this arrangement, it is possible to prevent any unintended change in distance between the circumferential ends of the sensor holder, thereby preventing separation of the sensor holder.

One of two seal grooves formed on the peripheral surface of the one of the inner and outer races formed with the raceway may be used as the above circumferential groove. This eliminates the necessity to form a separate circumferential groove for receiving the protrusion.

In another arrangement, the bearing assembly further includes a guide member fixed to the peripheral surface of the one of the inner and outer races that is formed with a raceway (which is hereinafter referred to as the "first peripheral surface"), the sensor holder is an endless annular member having a slide surface and is configured to be mounted to the one of the inner and outer races through the guide member with the slide surface in abutment with the guide member in the axial direction of the rolling bearing, and fitted to the guide member over the entire circumference of the slide surface, and with the sensor holder mounted to the one of the inner and outer races through the guide member, the sensor holder is coupled to the stationary member by the fixing arrangement. With this arrangement, since the sensor holder and the guide member abut each other in the axial direction, and are also fitted one around the other, it is possible to support the sensor holder on the one of the inner and outer races through the guide member, and once the sensor holder is coupled by the fixing arrangement, the sensor holder can be positioned axially and radially. The guide member allows sliding of a sensor holder of the type which cannot slide easily if directly pressed to the bearing race, and also makes it possible to adjust the magnetic gap between the magnetic sensor and the encoder according to the shape of the sensor holder. If the guide member is press-fitted to the one of the inner and outer races, no circumferential groove is necessary.

In another arrangement, the bearing assembly further includes a holder stopper fixed to the first peripheral surface such that when the sensor holder is mounted to the one of the inner and outer races, the sensor holder abuts the holder stopper in the axial direction. With this arrangement, the guide member can be easily fixed in position. By abutting the holder stopper, it is possible to prevent inclination of the sensor holder relative to the axial direction.

The sensor holder can be mounted in position using only the guide member and without fixing the holder stopper to the one of the inner and outer races.

For example, in one arrangement, the bearing assembly further includes a holder stopper mounted to the one of the inner and outer races so as to be rotatable about the center axis of the rolling bearing, the guide member is press-fitted to the one of the inner and outer races, and the holder stopper and the sensor holder are fixed together such that the sensor holder is rotatable relative to the one of the inner and outer races around the center axis of the rolling bearing. With this arrangement, the sensor holder can be fixed in position to the one of the inner and outer races even before the sensor holder is coupled to the stationary member.

The fixing arrangement may comprise at least one threaded member fastening a coupling portion of the sensor holder protruding from the one of the inner and outer races to the stationary member in the axial direction of the rolling bearing.

Alternatively, the fixing arrangement may include an engaging member extending diametrically between the stationary member and the sensor holder, wherein the sensor holder can be coupled to the stationary member through the engaging member, and wherein the engaging member includes a peripheral portion supporting a second axial end of the sensor holder protruding from the one of the inner and outer races in the radial direction of the rolling bearing, and a side portion supporting the second axial end of the sensor holder in an axial direction of the rolling bearing. By coupling the engaging member to the stationary member, it is possible to axially and radially position the sensor holder relative to the one of the inner and outer races. The engaging member also prevents run-out of the second axial end of the sensor holder during detection. The engaging member may be coupled to the stationary member by any suitable means such as by threaded members.

Preferably, the sensor holder has first protrusions and recesses formed at the second axial end of the sensor holder, and the engaging member has second protrusions and recesses which engage the first protrusions and recesses in the circumferential direction. With this arrangement, compared to the arrangement in which the sensor holder is fitted to the peripheral portion with an interference fit, when the sensor holder slides relative to the one of the inner and outer races, it is possible to more reliably prevent relative rotation between the sensor holder and the engaging member.

In order to achieve the second object, the present invention proposes to use as the sensor case an assembled combination of a sensor case to which the magnetic sensor is fixed and a sensor support body supported on the first peripheral surface of the one of inner and outer races.

In particular, in order to achieve the second object, the present invention provides a bearing assembly with a rotation sensor comprising a bearing including an inner race and an outer race, a sensor case, a magnetic sensor fixed to the sensor case, a sensor support body supported by a first peripheral surface of the inner and outer races that is formed with a raceway, an encoder rotationally fixed to the other of the inner and outer races so as to rotate in unison with the other of the inner and outer races, and wires for connecting the magnetic sensor to an external device, wherein when the sensor case is fitted to the sensor support body in a first direction, the sensor support body is configured to guide the sensor case to a fitted position where the magnetic sensor is located at a detecting position, wherein the sensor support body is an annular member mounted on the first peripheral surface so as to be slidable in a circumferential direction of the rolling bearing, wherein the bearing assembly further comprises springs disposed between the sensor support body and the sensor case and configured to keep the sensor case immovable in a second direction opposite to the first direction relative to the sensor support body, the springs being movable by external force to released positions where the sensor case is uncoupled from the sensor support body so as to be movable in the second direction relative to the sensor support body.

If there is a possibility of breakage of the wires when the one of the inner and outer races creeps, only the sensor support body can be rotationally fixed in position using an external member. With this arrangement, if creeping occurs during operation of the bearing, the sensor support body is prevented from rotating by the external member, so that the sensor support body slides in the circumferential direction relative to the first peripheral surface according to the creep distance. This prevents the wires from being pulled in the circumferential direction and broken. When it is necessary to replace the rolling bearing due to the creeping problem, the wires connected to the sensor case can be continuously used. Since the sensor case is fitted to the sensor support body by moving the sensor case in a first direction relative to the sensor support body, by preventing the movement of the sensor case relative to the sensor support body in the second direction opposite to the first direction, the sensor case can be fixed in the fitted position. By using springs, instead of an adhesive, as means for preventing the movement of the sensor case in the second direction, it is possible to uncouple the sensor case from the sensor support body simply by elastically deforming the springs. Since the sensor case is fixed in the fitted position using the springs and the guide structure only, no damage remains on the surface of the sensor case after the sensor case has been removed from the sensor support body as in the case when the adhesive bond has been broken. Thus, the once removed sensor case can be used to be fitted to the sensor support body of a different bearing assembly with a rotation sensor.

In one arrangement, each of the springs includes mutually independent first and second hooks, the sensor case has grooves in which the respective springs can be received with the respective first hooks compressed, and the sensor support body has recesses in which the grooves can be inserted when the sensor holder is moved toward the fitted position in the first direction relative to the sensor support body, wherein when the grooves are inserted into the respective recesses, the second hooks are elastically deformed by contact with surfaces of the respective recesses, thereby engaging the surfaces of the respective recesses, and wherein the springs can be moved to the released positions by elastically deforming the respective second hooks until the respective second hooks disengage from the surfaces of the respective recesses.

Since the first and second hooks are provided independently of each other, it is possible to keep the springs set in position in the sensor case by elastically pressing the first hooks against the walls of the respective grooves, and simultaneously to elastically deform the second hooks by contact with the surfaces of the respective recesses, thereby elastically pressing the second hooks against the surfaces of the respective recesses, when the sensor case is moved toward the fitted position. Thus, the sensor case can be fixed to the sensor support body in the fitted position through the springs. When the sensor case is moved toward the fitted position, since the first hooks are inserted into the respective recesses together with the grooves, and the second hooks, which contact the surfaces of the recesses, are also inserted into the recesses, the recesses prevent the first and second hooks from being hit by any unexpected object. Spaces remain in the respective recesses where the second hooks have passed when the sensor case has been fitted into the sensor support body. By inserting e.g. rods into these spaces, it is possible to deform the second hooks, thereby separating the second hooks from the surfaces of the recesses. The sensor case can thus be uncoupled from the sensor support body.

To fix the sensor case in the fitted position, springs may be set in the sensor support body. In this arrangement too, the springs can be protected.

Specifically, in this arrangement, the sensor support body has spring receiving recesses in which the respective springs are received, the springs each comprise a fitted portion restricted by the corresponding spring receiving recess, and a free end portion protruding from the fitted portion into air, and the sensor case has leading portions each configured to be pushed into between the fitted portion and the free end portion of the spring received in the corresponding spring receiving recess when the sensor case is moved toward the fitted position in the first direction, and engaging portions provided in the rear of the respective leading portions with respect to the first direction and each configured to be pushed into between the fitted portion and the free end portion of the spring received in the corresponding spring receiving recess, following the respective leading portions, wherein when the sensor body is moved toward the fitted position in the first direction, the free end portions of the respective springs are elastically deformed by contact with the respective leading portions, storing elastic restoring force, and then engage the respective engaging portions under the elastic restoring force, and wherein the springs can be moved to the released positions by elastically deforming the respective free end portions until the respective free end portions disengage from the respective engaging portions.

By setting the springs in the respective spring receiving recesses, the springs each including a fitted portion restricted by the corresponding spring receiving recess, and a free end portion protruding from the fitted portion into air, it is possible to fit the fitted portion in the spring receiving recess so that the free end portion is deformable. By providing the sensor case with leading portions each configured to be pushed into between the fitted portion and the free end portion of the spring received in the corresponding spring receiving recess when the sensor case is moved toward the fitted position in the first direction, it is possible to elastically deform the free ends by contact with the respective leading portions, thereby storing elastic restoring force. The engaging portions, which are configured to be inserted into the respective spring receiving recesses following the leading portions, are provided higher or lower than the leading portions, so that the free end portions can elastically engage the respective engaging portions. With the free end portions in engagement with the engaging portions, the sensor case is fixed to the sensor support body through the springs in the fitted position. Since the free end portions engage the respective engaging portions in the respective spring receiving recesses, the spring receiving recesses prevent the free end portions from being hit by any unexpected object. Spaces remain in the respective recesses where the free end portions have passed. By inserting e.g. rods into the above respective spaces, it is possible to elastically deform the free end portions so as to disengage the free end portions from the engaging portions, thus uncoupling the sensor case from the sensor support base.

Preferably, the springs each comprise a leaf spring formed of a single metal sheet.

Compared to wire springs, by forming each spring from a single metal sheet, it is possible to provide this single metal sheet with at least one hook by cutting and bending the metal sheet. This ensures higher strength of each part of the springs, and increases the support areas of the insert portions and insert holes.

The direction in which the sensor case is moved toward the sensor support body to the fitting position can be determined according to the structure to which the bearing is mounted, such as a housing or a lid. Such a direction may be e.g. a radial direction or an axial direction.

In one arrangement, the first direction is an axial direction of the rolling bearing, wherein with the inner and outer races mounted between a rotary shaft and a housing, the sensor case is separable from the sensor support body in the opposite axial direction.

By determining an axial direction as the above first direction, it is possible to separate the sensor case from the sensor support body using the space through which the inner and outer races are mounted and dismounted before dismounting the inner and outer races from the respective members to which the inner and outer races have been mounted. Thus it is possible to prevent possible damage to the sensor case, which is to be continuously used, when dismounting the inner and outer races.

The sensor support body may be of the type having a portion protruding from the bearing while the sensor support body is supported by the one of the inner and outer races and adapted to support the sensor case in the fitted position, or of the type having an annular portion fitted on the peripheral surface of the one of the inner and outer races formed with the raceway and adapted to support the sensor case in the fitted position.

Before the sensor case is fitted to the sensor support body in the fitted position, the magnetic sensor can be inserted into the sensor case from a suitable direction, and fixed to the sensor case. For compactness of the sensor support body, its entire radial dimension is preferably small, and the circuit of the magnetic sensor is preferably entirely received in a single sensor mounting portion. But in this arrangement, the magnetic sensor may have to be provided so as to protrude radially toward the other of the inner and outer races from the sensor support body to ensure a proper gap between the encoder and the magnetic sensor. In such a case, since the sensor mounting portion protrudes radially toward the other of the inner and outer races from the sensor mounting portion, the sensor case is preferably rigidly held in position by the sensor support body. If the sensor case is to be reused after a long period of use of the bearing assembly, protection is preferably provided for the portion of the sensor case closing the opening of the sensor mounting portion, such as resin molding or a lid.

For example, in a preferred arrangement, the magnetic sensor protrudes from the sensor support body in a radial direction of the rolling bearing toward the other of the inner and outer races, the sensor case has a sensor mounting portion having a sensor mounting chamber defined by a tubular inner wall surface, the magnetic sensor being mounted in the sensor mounting chamber and held in position by the tubular inner wall surface, the sensor mounting portion has an open end facing the one of the inner and outer races, the open end being closed by a closure portion, the sensor mounting portion has wall portions located on respective sides of the closure portion in the circumferential direction, and the wall portions are configured to position the sensor mounting portion in the circumferential direction when the sensor case is moved toward the fitted position in the first direction.

Since the tubular opening of the sensor mounting portion radially facing the other of the inner and outer races is closed, the sensor support body protects the closure portion. The closure portion is a member having rigidity sufficient to position the sensor case, such as resin molding or a lid fitted in the opening. The wall portions, which are located on both circumferential sides of the closure portion, circumferentially rigidly position the sensor mounting portion when the sensor case is in the fitted position. The wall portions thus prevent deformation of the inner wall surface of the sensor mounting portion, which positions the magnetic sensor.

When the sensor case is fitted to the sensor support body in the fitted position, the radial position of the sensor case relative to the bearing is fixed through the sensor support body, which is supported on the first peripheral surface. Since the sensor case is significantly smaller in circumferential dimension than the sensor support body, as long as the sensor case can be radially positioned relative to the sensor support body, it is not necessary to use a ring-shaped sensor case which can be coaxially fitted to the sensor support body from an axial direction for radial positioning. When the magnetic sensor protrudes radially toward the other of the inner and outer races from the sensor support body, it is possible to use a compact non-annular sensor case in which only necessary positioning portions are added to the sensor mounting portion so that circumferential portions thereof are fitted to the sensor support body.

For example, in a preferred arrangement, the first direction is an axial direction of the rolling bearing, the sensor case has legs protruding from the respective wall portions in the direction toward the one of the inner and outer races, the sensor case is fitted in a circumferential portion of the sensor support body when the sensor case is in the fitted position, the wires extend through the closure portion of the sensor mounting portion and extend between the legs in the axial direction, and the sensor support base has a wire retaining groove located so as to face the closure portion of the sensor mounting portion in the radial direction when the sensor case is in the fitted position, in which when the sensor case is moved toward the fitted position in the first direction, the wires enter the wire retaining groove, the legs position the sensor case in the radial direction, and circumferential side walls of the wire retaining groove keep a distance between the legs in a direction perpendicular to the radial direction.

By determining an axial direction as the above first direction, it is possible to provide the sensor case with legs extending radially toward the one of the inner and outer races from the wall portions on both circumferential sides of the closure portion of the sensor mounting portion. Since the legs protrude radially toward the one of the inner and outer races, the legs radially position the sensor case when the sensor case is guided to the fitted position. Thus, it is not necessary that the sensor case be an annular member, which thus makes it possible to minimize the size of the sensor case such that it is fitted to a circumferential portion of the sensor support body. The legs, which are provided on both circumferential sides of the sensor case, make it possible to arrange the wires so as to extend through the closure portion of the sensor mounting portion into a space between the legs and to extend in the axial direction. With this arrangement, when the sensor case is moved toward the sensor support body to the fitted position, the wires can be held in position between the legs. By forming the wire retaining groove in the sensor support body such that the wire retaining groove radially faces the closure portion of the sensor mounting portion, it is possible to guide the wires held in position between the legs into the wire retaining groove when the sensor case fitted to the sensor support body. When the sensor case is fitted to the sensor support body, the side walls of the wire retaining groove are inserted between the legs and serve to keep the distance between the legs, thereby preventing displacement of the sensor mounting portion due to the shortening of the distance between the legs.

In particular, the side walls of the wire retaining groove are preferably configured to support the sensor mounting portion in the radial direction while the sensor case is in the fitted position.

Using the wire retaining groove, it is possible to prevent shifting of the sensor support portion toward the one of the inner and outer races.

The legs are radially positioned by the wall portions of the sensor support portion and the distance between the legs is kept constant by the side walls of the wire retaining groove. Thus the legs are rigidly fixed in position. The legs thus serve to further rigidly fix the sensor holder in the fitted position.

Thus, the springs may be configured to act on the leg.

Since the springs act on the legs, which protrude from the closure portion of the sensor mounting portion, the sensor mounting portion is never deformed by the springs.

Instead of by means of the springs, the sensor case may be fastened to the sensor support base by means of threaded members in the fitted position such that the sensor case can be uncoupled from the sensor support base by turning and pulling out the threaded members.

In this arrangement, the sensor case is guided into the sensor support body in the above manner and fixed in the fitted position by the threaded members. When replacing the bearing due to the problem of creeping, the sensor case can be dismounted from the sensor support body by pulling out the threaded members and moving the sensor body in the second direction. No damage, such as damage due to breaking of the adhesive bond, remains on the surface of the sensor case. The sensor case is thus reusable, i.e. can be fitted to a new sensor support body.

The sensor support body may be slidably fitted to the above-mentioned first peripheral surface by fitting a protrusion of the sensor support body in a peripheral groove formed in the first peripheral groove. With this arrangement, the sensor support body is radially and axially positioned.

In a specific arrangement, the sensor support base is an annular member formed by positioning two split halves diametrically opposite to each other around the first peripheral surface and coupling the two split halves together, wherein the first peripheral surface is formed with a circumferential groove extending along an entire circumference of the first peripheral surface, wherein the split halves each have a rib configured to be fitted in the circumferential groove, and a slide surface configured to be fitted on the first peripheral surface, and wherein the sensor support body is fitted to the one of the inner and outer races by engagement between the ribs and the circumferential groove in the axial direction and fitting between the first peripheral surface and the slide surfaces in the radial direction.

By fitting the protrusions of the two split halves in the circumferential groove from the radial direction and coupling the split halves together, the sensor support body can be fitted to the bearing race. As long as the sensor support body maintains its annular shape, the sensor support body is kept in position relative to the bearing in the axial direction due to the engagement between the protrusions and the circumferential groove and in the radial direction due to the fitting between the first peripheral surface and the slide surface. This sensor support body can be fitted to the bearing more easily than an endless sensor support body made of a hard material and including a protrusion adapted to be moved over the edge of the circumferential groove into the groove in the axial direction.

The two split halves are preferably formed parts identical in shape.

Since the first peripheral surface is sandwiched by the two split halves from diametrically opposite directions, the split halves may be identical in shape. Thus such split halves can be mass-produced using a single mold. The cost for such a single mold is lower than the cost for two molds needed to form two respective split halves which are different in shape from each other.

Two of the sensor cases may be used, with each being configured to be mounted to one of the split halves.

By mounting the two sensor cases to the respective identically shaped split halves, even if the magnetic sensor in one of the sensor cases malfunctions, detection can be made with the sensor in the other of the sensor cases.

The split halves may be coupled together by any means provided the split halves can be formed into the sensor support body.

In a specific arrangement, the split halves each have first and second circumferential ends, and are each formed with an engaging claw at the first circumferential end and a claw engaging portion at the second circumferential end, wherein with the split halves positioned diametrically opposite to each other around the first peripheral surface, by bringing the engaging claw of each of the split halves into engagement with the claw engaging portion of the other of the split halves, the split halves are coupled together into the sensor support body.

Since the split halves are identical in shape with each split half having an engaging claw at one circumferential end and a claw engaging portion at the other circumferential end, simply by positioning the two split halves diametrically opposite to each other around the first peripheral surface and moving the split halves toward each other, the engaging claws engage the respective claw engaging portions and form the sensor support body.

But instead, the split halves positioned diametrically opposite to each other around the first peripheral surface may be coupled together by fastening the split halves together by means of threaded members.

Compared to the arrangement in which the engaging claws are used, a long time is needed to couple the split halves with the threaded members. But the sensor support body can be more easily dismounted from the bearing race simply by turning and pulling out the threaded members.

In order to keep the sensor support body rotationally fixed in position even if creep occurs, the sensor support body may be fixed to a stationary external member through a coupling member, or the sensor support body may be brought into circumferential engagement with the stationary external member. The latter arrangement is preferable because it needs no coupling member.

In a specific arrangement, the bearing assembly further comprises an external member having an engaging portion which is in engagement with the sensor support body in the circumferential direction, and kept stationary.

According to the present invention, since the sensor holder is mounted to the one of the inner and outer races so as to be slidable in the circumferential direction, even if the one of the inner and outer races creeps, the wires are never broken.

According to the present invention, a user can rotationally fix the sensor support body in position to prevent breakage of the wires when creep occurs. If it is necessary to replace the bearing due to the problem of creeping, the sensor case can be uncoupled from the sensor support body by deforming the springs. The sensor case dismounted from the sensor support body can be fitted to a new sensor support body as it is.

BRIEF DESCRIPTION OF THE DRAWINGS

FIG. 3(a) is a sectional view taken along line II-II of FIG. 3(b); and FIG. 3(b) is a front view of a second embodiment.

FIG. 7 is an exploded perspective view of a sensor holder of the third embodiment.

FIG. 8(a) is a sectional view of a portion of a fourth embodiment, taken along the same line as the sectional view of FIG. 3(a); and FIG. 8(b) is a front view of FIG. 8(a).

FIG. 9 is an exploded perspective view of a sensor holder of the fourth embodiment.

FIG. 10(a) is a sectional view of a portion of a fifth embodiment, taken along the same line as the sectional view of FIG. 3(a); and FIG. 10(b) is a front view of FIG. 10(a).

FIG. 12 is a sectional view of the sixth embodiment, taken along a plane including a center axis of the bearing and a center axis of a tubular portion of a sensor case.

FIG. 13(a) is an exploded perspective view of a sensor support body of the sixth embodiment; and FIG. 13(b) is an enlarged front view of a portion of the sixth embodiment where there is an engaging claw.

FIG. 16 is an exploded perspective view of a sensor case of the sixth embodiment.

FIG. 18 is an exploded perspective view of a sensor case of the seventh embodiment.

DETAILED DESCRIPTION OF THE INVENTION

The first embodiment of the invention is now described with reference to FIGS. 1 and 2.

Figure 1:
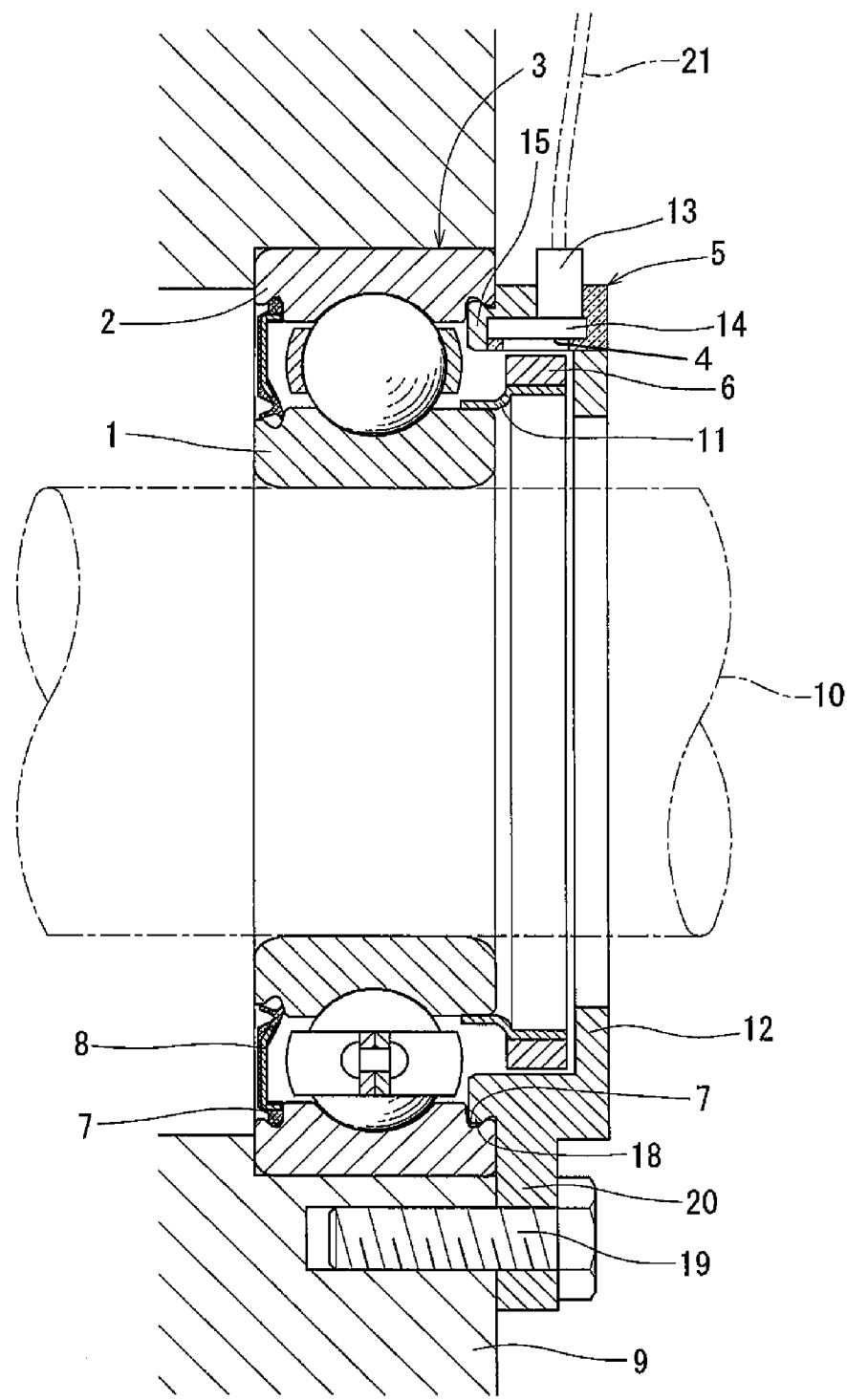
FIG. 1 is a sectional view taken along line I-I of FIG. 2.
Figure 2:
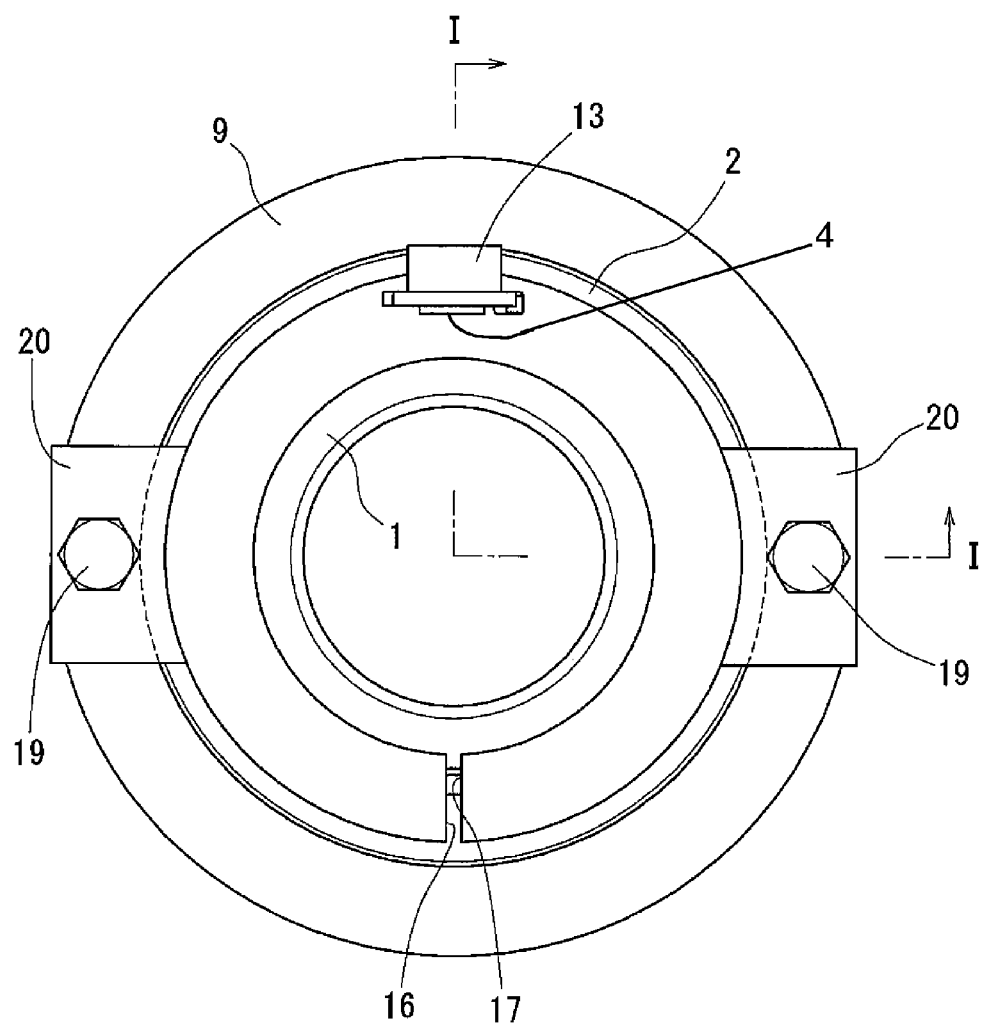
FIG. 2 is a front view of a first embodiment.
Figure 4:
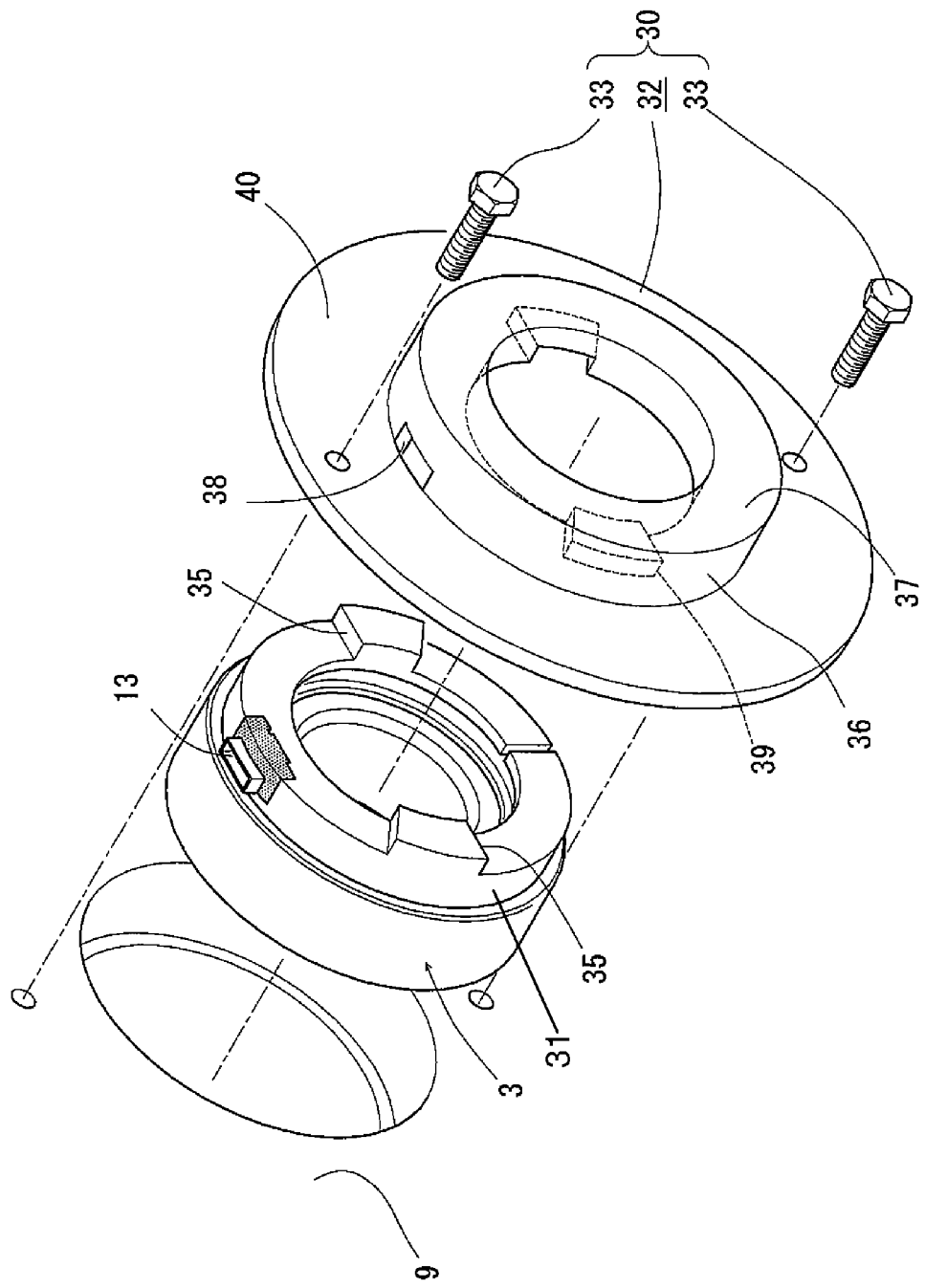
FIG. 4 is an exploded perspective view of the second embodiment.
Figure 5:
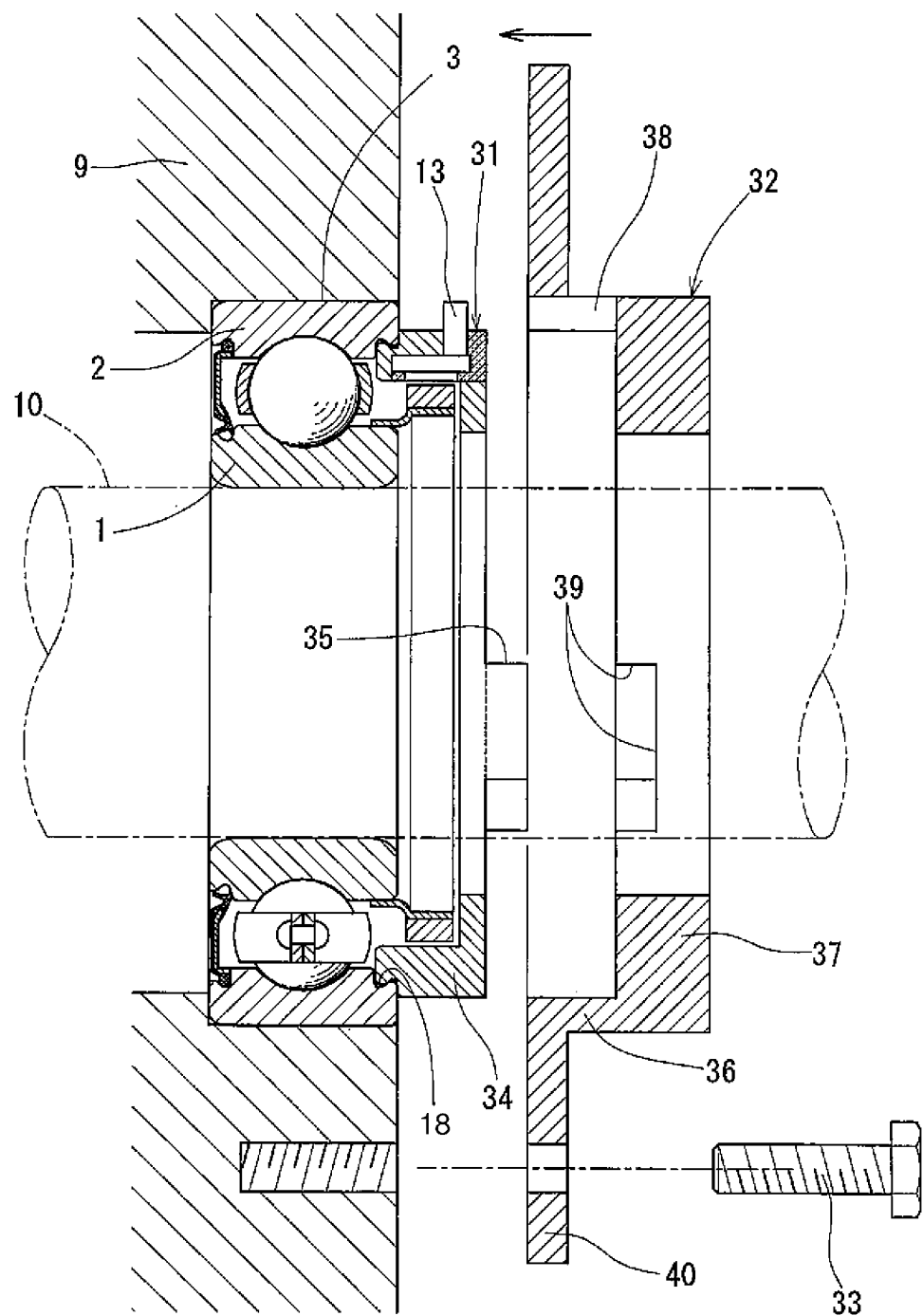
FIG. 5 is a sectional view of the second embodiment, taken along the same line as the sectional view of FIG. 1 and showing how an engaging member is used.

As shown in FIGS. 1 and 2, the bearing assembly with a rotation sensor assembly of the first embodiment includes a rolling bearing 3 including an inner race 1 and an outer race 2, and a magnetic sensor 4 retained by an annular sensor holder 5.

The rolling bearing 3 of this bearing assembly is of the inseparable type, with the sensor holder 5 mounted to one of the inner and outer races 1 and 2 (i.e. first bearing race 2), and an encoder 6 mounted to the other of the inner and outer races (second bearing race 1).

The first bearing race 2 is formed with two circumferential grooves 7 extending the entire circumference of the first bearing race 2. The circumferential grooves 7 are seal grooves for a seal 8 formed in the peripheral surface of the first bearing race 2 formed with the raceway. The rolling bearing 3 is a deep groove ball bearing having a seal on one side only.

The first bearing race 2 is fitted in a stationary member 9. The second bearing race 1 is fixed to a rotary member 10 rotatable relative to the stationary member 9. The rolling bearing 3 is disposed between the stationary member 9 and the rotary member 10 with a predetermined degree of concentricity maintained between the rolling bearing 3 and the rotary member 10. As used herein, the "circumferential direction" (or "circumferential" or "circumferentially") refers to the circumferential direction around the center axis of the rolling bearing 3; the "axial direction" (or "axial" or "axially") refers to the direction parallel to the center axis of the rolling bearing 3; and the "radial direction" (or "radial" or "radially") refers to any direction perpendicular to the center axis of the rolling bearing 3.

The magnetic sensor 4 and the encoder 6 are component parts of a known magnetic rotation sensor assembly. As used herein, the "rotation sensor assembly" refers to a sensor assembly which can produce at least one of electric detection signals indicative of the rotation angle, rotational speed and rotational direction of the target. The encoder 6 shown is an endless annular rubber magnet having circumferentially alternating N- and S-poles. The encoder 6 is secured to the peripheral surface of the second bearing race 1 formed with the raceway through a core bar 11. The magnetic sensor 4 is a sensor element which converts variations in the magnetic field when the encoder 6 rotates to an electric signal.

The sensor holder 5 is an annular member having circumferentially opposed ends 16 and 17. To minimize the number of parts of the bearing assembly, the sensor holder 5 is formed by injection molding into a single monolithic member. The sensor holder 5 has a side wall 12 axially facing the encoder 6, defining a labyrinth seal between the sensor holder 5 and the encoder 6. The sensor holder 5 supports and retains a circuit board 14 carrying an integrated circuit which includes the magnetic sensor 4, and a connector 13, in a predetermined position. The circuit board 14 is retained in position by resin molding. With the sensor holder 5 mounted to the first bearing race 2, the sensor holder 5 radially faces the encoder 6, which is mounted to the second bearing race 1. Instead of mounting the integrated circuit including the magnetic sensor 4 on the circuit board 14, wires and various elements may be individually directly soldered to the circuit board.

The sensor holder 5 has a first axial end 15 directly fitted in the first bearing race 2. The first axial end 15 has a protrusion 18 which can be fitted in one of the circumferential grooves 7 by elastically deforming the sensor holder 5 such that the gap between the circumferentially opposed ends 16 and 17 of the sensor holder 5 widens or narrows. The radially outer surface of the first axial end 15 other than its portion where there is the protrusion 18 is cylindrical in shape and fitted in the first bearing race 2. The protrusion 18 extends circumferentially between the circumferentially opposed ends 16 and 17.

With the sensor holder 5 elastically deformed such that the gap between the circumferentially opposed ends 16 and 17 narrows, the first axial end 15 is inserted into the bearing race 2 from one axial end of the bearing race 2 until the protrusion 18 is received in the circumferential groove 7. In this state, the sensor holder 5 is released to allow the first axial end 15 including the protrusion 18 to be elastically fitted snugly in the peripheral surface of the bearing race 2 formed with the raceway, including the circumferential groove 7. Thus the sensor holder 5 is fitted in the peripheral surface of the first bearing race 2 formed with the raceway. In this state, since the sensor holder 5 is positioned both radially and axially by its first axial end 15, the sensor holder 5 is joined to the bearing race 2 with sufficient strength such that when the roller bearing 3 is mounted between the stationary member 9 and the rotary member 10 in this state, the sensor holder 5 never separates from the roller bearing 3.

With the sensor holder 5 mounted to the first bearing race 2 in the above manner, they are kept in contact with each other along their respective circumferentially continuously extending surfaces. Thus, the sensor holder 5 can slide relative to the first bearing race 2. Since the sensor holder 5 is made of a resin, the sensor holder 5 could never adhere to the surface of the bearing race 2. Thus, even if the first axial end 15 is fitted in the bearing race 2 with an interference fit, the sensor holder 5 can still slide relative to the bearing race 2.

In order to prevent deformation of the first axial end 15 and other portions of the sensor holder 5 due to temperature creep, the sensor holder 5 is preferably formed by injection molding a material containing mainly a polyamide resin. The polyamide resin may e.g. be "AI Polymer MS", made by Mitsubishi Gas Chemical Company, Inc.

This bearing assembly includes a fixing arrangement 19 by means of which the sensor holder 5 is coupled to the stationary member 9, in which the first bearing race 2 is fitted. The fixing arrangement 19 includes at least one threaded member which can axially fasten a coupling portion 20 of the sensor holder 5 protruding from the bearing race 2 to the stationary member 9. For this purpose, the stationary member 9 is formed with a threaded hole in its side wall at a position corresponding to the coupling portion 20.

If two of the threaded members are used, portions of the sensor holder 5 near the respective circumferentially opposed ends 16 and 17 are preferably fastened to the stationary member 9. Once the sensor holder 5 is fastened to the stationary member in this manner, the circumferentially opposed ends 16 and 17 cannot move circumferentially relative to each other. Even if the sensor holder slides relative to the bearing race 2, since the slide resistance tends to move the ends 16 and 17 circumferentially away from each other, and not toward each other, the sensor holder 5 never separates from the bearing. But by fixing the gap between the ends 16 and 17 using the fixing arrangement 19, it is possible to more reliably prevent separation of the sensor holder 5. Even if the first bearing race is the inner race 1, it is possible to reliably prevent separation of the sensor holder with this arrangement.

After the rolling bearing 3 is mounted between the stationary member 9 and the rotary member 10 with the sensor holder 5 mounted to the first bearing race 2, wires 21 extending outwardly from the sensor holder 5 are connected to the connector 13, so that the magnetic sensor 4 is connected to an external device (not shown) through the wires 21. The wires 21 are formed into a cable. In this state, it is possible to detect the rotation of second bearing race 1 by means of the encoder 6, which rotates together with the first bearing race 1, and the magnetic sensor 4. Inputs and outputs for detection are transmitted and received through the wires 21.

If creep (relative rotation) occurs between the fitting surfaces of the stationary member 9 and the first bearing race 2, the sensor holder 5 slides relative to the bearing race 2, and never rotates relative to the stationary member 9, due to the resistance of the fixing arrangement 19. This prevents snapping of the wires 21.

FIGS. 3(*a*) to 5 show the second embodiment. The bearing assembly of this embodiment is identical to that of the first embodiment in that the sensor holder is an annular member having circumferentially opposed ends and fitted in one of the circumferential grooves of the rolling bearing, and that the sensor holder is coupled to the stationary member by a fixing arrangement. The second embodiment is described mainly regarding what differs from the first embodiment, and what has already been described is not repeated here.

The fixing arrangement 30 includes an engaging member 32 extending diametrically between the stationary member 9 and the sensor holder 31, and threaded members 33. The fixing arrangement can thus couple the sensor holder 31 to the stationary member 9 through the engaging member 32.

The sensor holder 31 has a second axial end 34 protruding from the first bearing race 2. The second axial end 34 has an axially outer side surface on which axial steps are formed which define protrusions and recesses 35.

The engaging member 32 includes a circumferentially continuous peripheral portion 36 and a side portion 37 protruding radially from one axial end of the peripheral portion 36.

The peripheral portion 36 can be fitted onto the second axial end 34 of the sensor holder 31 with the sensor holder 31 mounted on the first bearing race 2. The engaging member 32 is formed with a cutout 38 through which the connector 13 can pass (so as to be connected to the wires) when the engaging member is fitted in position. The side portion 37 has protrusions and recesses 39 which are configured to be circumferentially engaged with the respective recesses and protrusions 35 of the second axial end 34 when the peripheral portion 36 is fitted on the second axial end 34. The protrusions and recesses 35 and 39 are arranged such that they circumferentially engage at two circumferential portions near the respective circumferentially opposed ends 16 and 17 of the sensor holder so as to fix the gap between the circumferentially opposed ends 16 and 17.

The engaging member 32 further includes a flange 40 which can be fastened to the stationary member 9 by means of the threaded members 33 with its peripheral portion fitted on the second axial end 34. With the sensor holder 31 coupled to the stationary member 9 by tightening the threaded members 33 in the above manner, the peripheral portion 36 radially supports the second axial end 34, and the protrusions and recesses 35 engage the respective recesses and protrusions 39, thus rotationally fixing the sensor holder 31 in position by the engaging member 32. In this state, if creep occurs between the bearing race 2 and the stationary member 9, the sensor holder 31 slips relative to the bearing race 2 due to the resistance by the fixing arrangement 30. The peripheral portion 36 prevents run-out of the second axial end 34. The side portion 37 prevents separation of the sensor holder 31.

Figure 6:
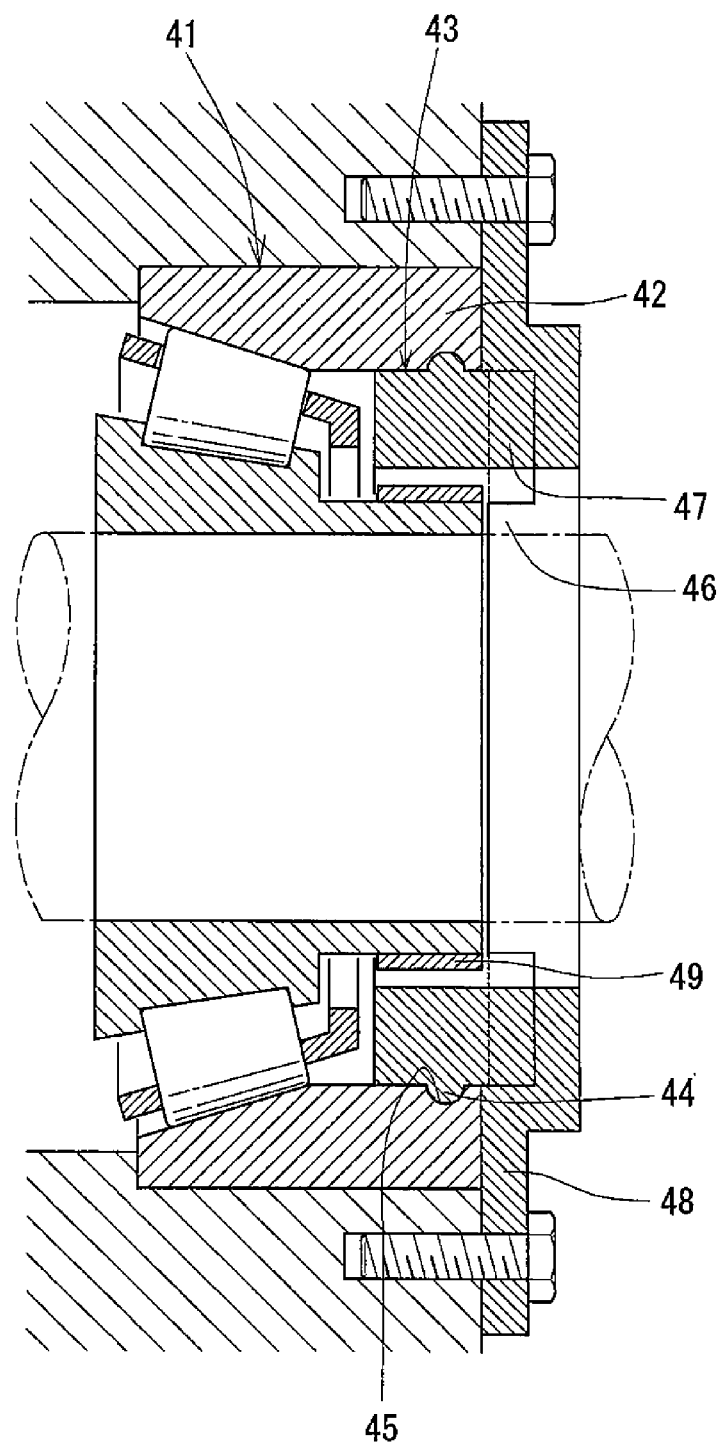
FIG. 6 is a sectional view of a third embodiment, taken along the same line as the sectional view of FIG. 1 and showing how an engaging member is used.

FIGS. 6 and 7 show the third embodiment. The bearing assembly of this embodiment is identical to that of the second embodiment in that the sensor holder is an annular member having circumferentially opposed ends and fitted in one of the circumferential grooves of the rolling bearing, and that the sensor holder is coupled to the stationary member by a fixing arrangement including an engaging member having a peripheral portion, a side portion and protrusions and recesses. The third embodiment is described mainly regarding what differs from the second embodiment, and what has already been described is not repeated here.

As shown, the bearing assembly of the third embodiment includes a rolling bearing 41 of the separable type. The rolling bearing 41 is a tapered roller bearing. Its first bearing race 42 has no seal grooves, and is formed, instead, with a circumferential groove 45 in which a protrusion 44 of the sensor holder 43 can be fitted. The sensor holder 43 has protrusions and recesses 46 corresponding to the protrusions and recesses 35 of the second embodiment. In this embodiment, since a protrusion 47 for supporting the circuit board is used as one of the protrusions of the protrusions and recesses 46, the engaging member 48 can be brought into engagement with the sensor holder at a larger number of circumferential points than in the second embodiment. This makes it possible to more strongly rotationally fix the sensor holder in position. The encoder 49 is a rubber magnet directly fitted on the surface of the second bearing race formed with the raceway, and has no core bar.

FIGS. 8(*a*), 8(*b*) and 9 show the fourth embodiment. The bearing assembly of this embodiment is identical to that of the third embodiment in that the first bearing race has no seal grooves, and that the sensor holder is coupled to the stationary member by a fixing arrangement including an engaging member having a peripheral portion, a side portion and protrusions and recesses. The third embodiment is described mainly regarding what differs from the third embodiment, and what has already been described is not repeated here.

As shown, the bearing assembly of the fourth embodiment includes a guide member 51 fixed to the peripheral surface of the first bearing race 50 formed with the raceway, and a holder stopper 52. The sensor holder 53 is an endless annular member. The sensor holder 53 has a slide surface 54 which axially abuts, and is fitted in, the guide member 51.

The holder stopper 52 is first press-fitted into the first bearing race 50, and fixed in position in the bearing race 50. Then, the guide member 51 is press-fitted into the holder stopper 52 until the guide member axially abuts the holder stopper 52, so that the guide member 51 is fixed in position. In this state, the sensor holder 53 is fitted into the guide member 51 until the sensor holder 53 axially abuts the holder stopper 52 and the slide surface 54 axially abuts the guide member 51. Thus, the sensor holder 53 is mounted in position to the bearing race 50 through the guide member 51. When the sensor holder 53, which has been mounted in position to the bearing race 50, is coupled to the stationary member (not shown), the sensor holder 53 never separates from the bearing. The sensor holder may be coupled to the stationary member by screws only or by screws and the engaging member.

Since the guide member 51 and the holder stopper 52 have cylindrical outer surfaces which are press-fitted in the bearing race 50, it is not necessary to form a circumferential groove in the bearing race 50.

Since the guide member 51 can be press-fitted into the holder stopper 52 until the guide member 51 abuts the holder stopper 52, the guide member 51 can be easily axially fixed in position. Axial abutment between the sensor holder 53 and the holder stopper 52 prevents axial inclination of the sensor holder 53. If the sensor holder 53 axially abuts the guide member 51 over a sufficiently large area, the holder stopper 52 may be omitted.

Since the guide member 51, holder stopper 52 and sensor holder 53 are all press-fitted in position, they may all be made of metal. The surface of the guide member 51 configured to be brought into contact with the slide surface 54 of the sensor holder 53 has higher slidability than the surface of the bearing race 50. The guide member 51 may be used as a bush for supporting the sensor holder 53. The holder stopper 52 may be used as a wall surface which allows positioning of a circuit board when the circuit board is axially inserted into the sensor holder 53.

The fourth embodiment represents an arrangement which allows the sensor holder to be press-fitted into and fixed in position in a bearing race having no circumferential groove using an additional member or members. The fifth embodiment of FIGS. 10(*a*) and 10(*b*) shows another such arrangement. Since the fifth embodiment is a modification of the fourth embodiment, only what differs from the fourth embodiment is mainly described, and the same names are used for identical elements.

As shown, the bearing assembly of the fifth embodiment differs from that of the fourth embodiment in that a holder stopper 62 is rotatably mounted on the first bearing race 60. After press-fitting the guide member 61 into the bearing race 60, the slide surface 64 of the sensor holder 63 is fitted into the guide member 61 from one axial direction to mount the sensor holder 63 to the bearing race 60. The holder stopper 62 is fitted into the bearing race 60 from the opposite axial direction. When the holder stopper 62 is fixed to the sensor holder 63, the sensor holder 63 is rotatably mounted to the bearing race 60.

Specifically, with the sensor holder 63 and the holder stopper 62 fixed to each other so as to axially sandwich the guide member 61, the sensor holder 63 and the holder stopper 62 are axially positioned relative to the bearing race 60 by means of the guide member 61, and also radially positioned relative to the bearing race 60. Thus the fifth embodiment is preferable to the fourth embodiment in that the sensor holder 63 can be rotatably mounted in position to the bearing race 60, which has no seal groove or any other circumferential groove, even before the sensor holder 63 is coupled to the stationary member.

The holder stopper 62 is fixed to the sensor holder 63 by means of threaded members 65 threaded into the sensor holder 63. But instead, the holder stopper 62 and the sensor holder 63 may be fixed to each other by engaging claws formed on one of the holder stopper and the sensor holder in engaging holes formed in the other of the holder stopper and the sensor holder. Since the bearing race 60 is a separable type, the guide member 61, holder stopper 62 and sensor holder 63 can be mounted in position to the bearing race 60 in a side space. But if the bearing race 60 is an inseparable type, the holder stopper 62 is mounted first, then after press-fitting the guide member 61, the holder stopper 63 is mounted, and finally the threaded members are threaded into the holder stopper 62 from outside. If the first bearing race 60 is a separable type, it is not necessary to mount the holder stopper 62 first. By threading the threaded members 65 into the sensor holder 63, it is not necessary to form counterbores for threaded members in the engaging member, and also, the positions of the protrusions and recesses of the engaging member can be freely determined irrespective of the positions of the threaded members.

Figure 11B:
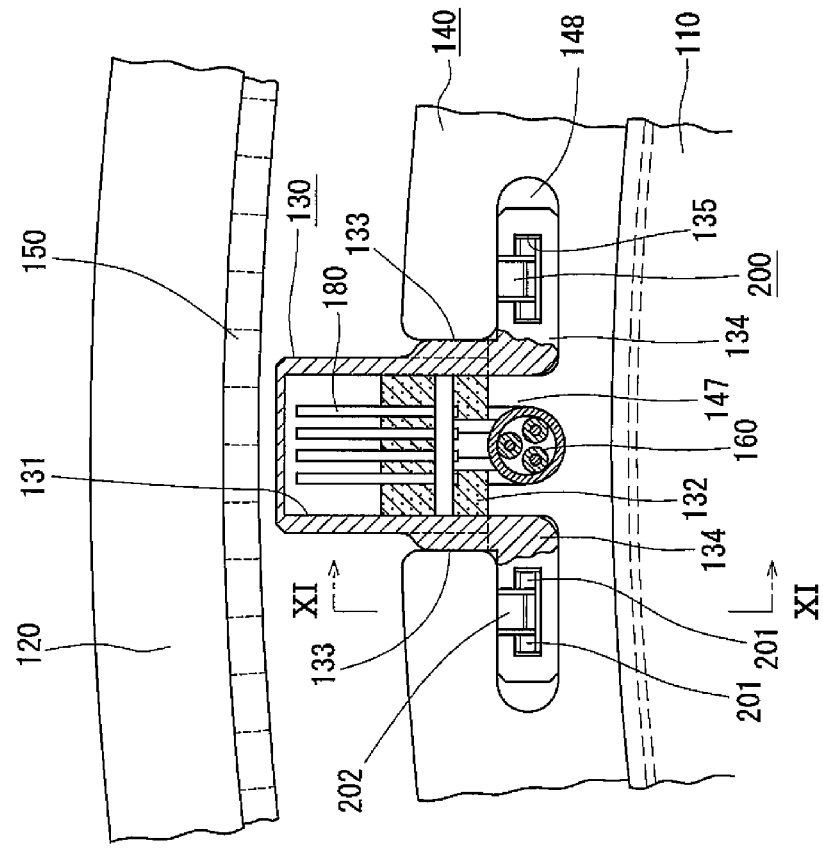
FIG. 11(b) is a partially cutaway enlarged front view of a portion of a sixth embodiment.
Figure 11A:
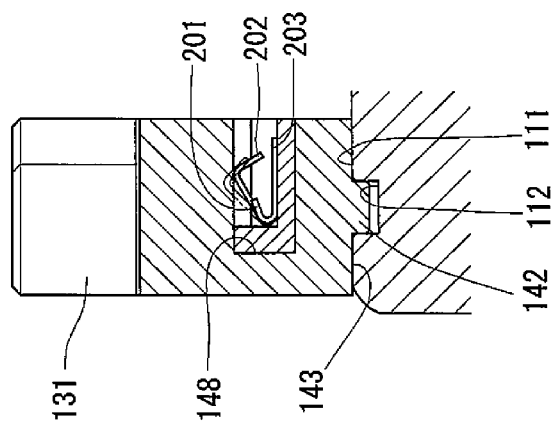
FIG. 11(a) is a sectional view taken along line XI-XI of FIG. 11(b)

Now the sixth embodiment is described with reference to the drawings. As shown in FIGS. 11(a), 11(b) and 12, the bearing assembly of this embodiment includes a rolling bearing including inner and outer races 110 and 120, and rolling elements rollably disposed between the inner and outer races, a magnetic sensor unit including a sensor case 130 and a sensor support body 140, an encoder 150, wires 160 connected to an external device, and an en external member 170 mounted outside the bearing. The sensor support body 140 is supported on a peripheral surface 111 of the bearing race 110 (which is hereinafter referred to as the "first bearing race" 110) formed with the raceway. With the magnetic sensor 180 fixed in position, the sensor case 130 is fitted on the sensor support body 140.

The first bearing race 110 is fitted on a stationary member (not shown) with a loose fit. The other (i.e. second) bearing race 120 is fitted in a rotary member (not shown) such that the bearing is mounted between the stationary member and the rotary member with a predetermined degree of concentricity maintained between the rolling bearing and the rotary member.

The rolling bearing shown is a tapered roller bearing of a separable type. But if rotational accuracy at low loads around the center axis of the rolling bearing is important, a ball bearing such as a deep groove ball bearing of an inseparable type may be used instead.

The magnetic sensor 180 and the encoder 150 are component parts of a magnetic rotation sensor assembly, of which the encoder 150 converts the rotation of the second bearing race 120 to a change in bias magnetic field (magnetic flux), and the magnetic sensor 180 is a circuit that converts the change in magnetic flux to a detection signal. A member for applying the bias magnetic field may be provided on either of the bearing races 110 and 120. In the example shown, the magnetic sensor 180 has a built-in back magnet 190 and applies the bias magnetic field. The encoder 150 is thus constituted by a pulsar ring made of a magnetic material. The pulsar ring is formed with through holes or radial protrusions and recesses so that the magnetic flux sensed by the magnetic sensor 180 changes when the pulsar ring rotates about the center axis of the rolling bearing. The encoder 150 is press-fitted on the inner peripheral surface of the bearing race 120 formed with the raceway so as to rotate in unison with the bearing race 120. The magnetic sensor may be any known sensor such as a Hall element or a magnetoresistor. Alternatively, the encoder may be a magnet having circumferentially alternating N- and S-poles and adapted to apply the bias magnetic field to the magnetic sensor. Such an encoder may be a rubber magnet bonded by vulcanization to a core bar fitted on the peripheral surface of the second bearing race formed with the raceway, or a rubber ring directly press-fitted in the second bearing race.

The magnetic sensor unit is fitted on the first bearing race 110 and the encoder 150 is fitted in the second bearing race 120 such that they are placed in a detecting position where the magnetic sensor 180 radially faces the encoder 150 with a predetermined gap therebetween.

When the sensor case 130 is inserted in one axial direction from outside the bearing space between the inner and outer bearing races 110 120 into the bearing space (this axial direction is hereinafter referred to as the "first axial direction"), the sensor support body 140 guides the sensor case 130 to the detecting position.

The sensor support body 140 is an annular member circumferentially slidably fitted on the peripheral surface 111 of the bearing race 110, i.e. the surface formed with the raceway. The bearing assembly of this embodiment includes a sensor case fixing arrangement including springs 200 disposed between the sensor support body 140 and the sensor case 130 and configured to prevent movement of the sensor case 130 in the second axial direction which is opposite to the above first axial direction relative to the sensor support body 140 when the springs 200 are in their engaged positions, and to allow movement of the sensor case 130 in the second axial direction relative to the sensor support body 140 when the springs 200 are moved to disengaged positions.

As shown in FIGS. 11(a), 11(b) and 13, the sensor support body 140 includes two split halves 141 configured to be coupled together into the annular sensor support body 140, which is wrapped around the peripheral surface 111 formed with the raceway. The peripheral surface 111 is formed with a circumferential groove 112 extending the entire circumference of the peripheral surface 111 at one end thereof. The split halves each have a rib 142 which can be engaged in the circumferential groove 112, a slide surface 143 which can be fitted on the peripheral surface 111, an engaging claw 144 formed at one circumferential end thereof, and a claw engaging portion 145 formed at the other circumferential end thereof. To assemble the annular sensor support body 140, the split halves 141 are positioned diametrically opposite to each other with respect to the axis of the peripheral surface 111 such that their ribs 142 radially face the circumferential groove 112, and are moved toward each other until the engaging claw 144 of each split half 141 engages, by elastic deformation, the claw engaging portion 145 of the other split half 141 and simultaneously, the ribs 142 engage in the circumferential groove 112. In this state, the slide surfaces 143 are also fitted on the peripheral surface 111, so that the sensor support body 140 is mounted in position on the bearing race 110.

The split halves 141, each having the engaging claw 144 and the claw engaging portion 145, which is adapted to engage the engaging claw 144 of the other split half 141, are identical in shape. The split halves 141 are formed by injection molding. Since the split halves 141 are identical in shape, they can be mass-produced using a single mold.

As shown in FIG. 12, the external member 170 has engaging portions 171 configured to circumferentially engage the sensor support body 140. The engaging portions 171 are axial holes formed in the side surface of the external member. The split halves 141 have, on their side surfaces, insert portions 146 configured to be inserted in the respective engaging portions 171. Since the external member 170 is mounted to the stationary member (not shown) to which the bearing race 110 is mounted, the external member 170 is also stationary relative to the bearing race 110. A stationary member to which the bearing is mounted, such as a housing, a housing cover or a spacer, may be used as the external member 170 to reduce the number of necessary parts. After the bearing race 110 has been fixed in position, the external member 170 is axially moved toward the bearing race 110 until the insert portions 146 are inserted into and thus circumferentially engage the respective engaging portions 171. With the insert portions engaging the engaging portions, the external member 170 prevents rotation of the sensor support body 140 even if the bearing race 110 creeps during operation of the bearing. Thus, if the bearing race 110 creeps during operation of the bearing, circumferential slip corresponding to the creep distance of the bearing race 110 occurs between the sensor support body 140 and the peripheral surface 111 formed with the raceway.

The sensor support body 140 and the external member 170 may be rotationally fixed together not by means of the axial protrusions and recessed formed in the side surfaces of the respective members 140 and 170, as in the sixth embodiment, but by means of radial protrusions and recesses formed on the radially inner or outer surface of the sensor support body 140 and the corresponding peripheral surface of the external member.

Since the sensor support body 140 is made of a resin, the sensor support body could never adhere to the surface of the bearing race 110, i.e. can slide on its peripheral surface 111 formed with the raceway. In order to prevent deformation due to temperature creep, the split halves 141 may be formed by injection molding of a polyamide imide resin. But provided the split halves 141 can slide circumferentially relative to the peripheral surface 111, they may be made of any other material such as an aluminum alloy or a ferrous alloy.

Figures 14A, 14B:
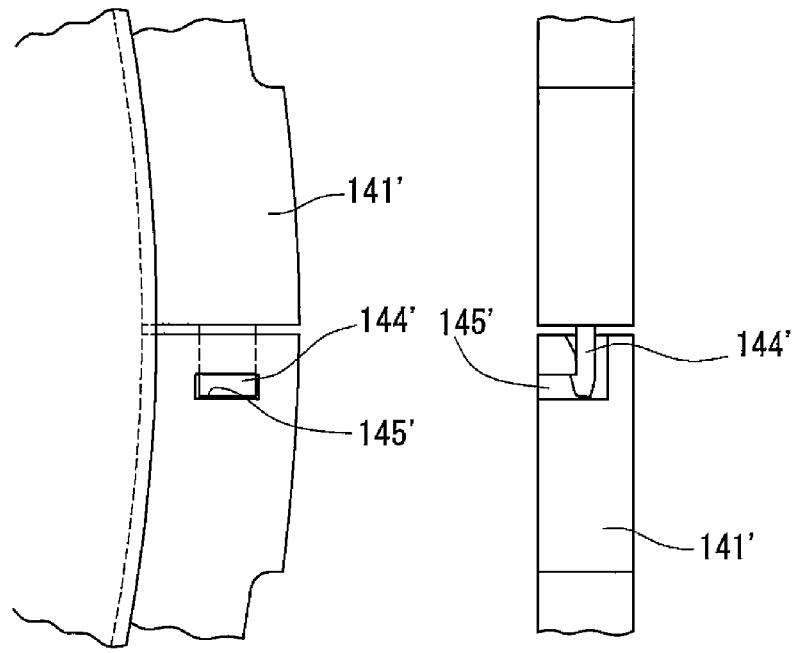
FIGS. 14(a) and 14(b) are partial enlarged front view showing a different engaging claw.

In the example shown, the engaging claws 144 are configured to be radially elastically deformed. But instead, split halves 141' shown in FIGS. 14(a) and 14(b) may be used which have engaging claws 144' configured to be axially elastically deformed. As is apparent from FIG. 13(a), which shows the entire shape of the split halves 141, if the insert portions 146 are formed on side surfaces of these split halves, the split halves 141 of FIG. 13(a) can be formed using a mold having axially split mold halves such that the engaging claws 144 and the claw engaging portions 145 as shown can be formed by simply axially separating the mold halves from each other. In the example of FIGS. 14(a) and 14(b), an undercut necessarily forms in each claw engaging portion 15. Thus, the example of FIGS. 13(a) and 13(b) is preferable.

Figure 15:
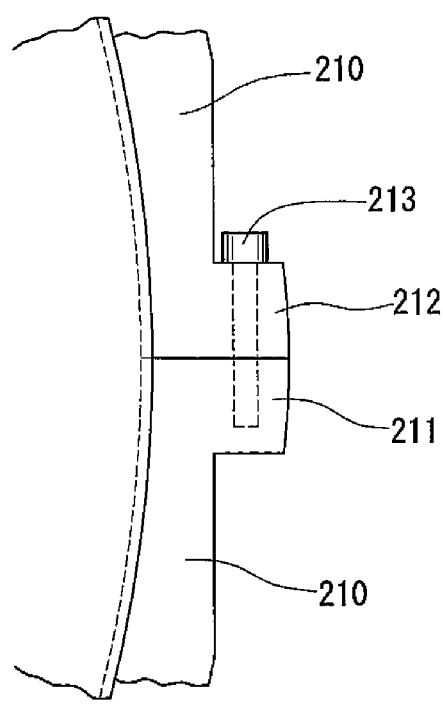
FIG. 15 is a partial enlarged front view showing a different means for coupling the sensor support body.

The sensor support body of FIG. 15 is formed of two split halves 210 surrounding the peripheral surface formed with the raceway, and each having a first circumferential end 211 formed with a threaded hole and a second circumferential end 212 formed with a threaded hole which can be aligned with the threaded hole formed in the first circumferential end 211 of the other split half 210. By driving in threaded members 213 into the thus aligned pairs of threaded holes, respectively, the split halves 210 can be coupled together. Compared to the engaging claws, the threaded members 213 can be more easily loosened and thus the sensor support body of FIG. 15 can be more easily dismounted from the bearing, when the bearing is replaced with a new one. Thus, the sensor support body of FIG. 15 can be more easily re-mounted on the new bearing if the sensor support body is still usable.

As shown in FIGS. 11(b) and 12, the sensor case 130 has a tubular sensor mounting portion 131 having a sensor mounting chamber defined by the inner wall surface of the sensor mounting portion 131. A magnetic sensor 180 is mounted in the sensor mounting chamber while being retained in position by the inner wall surface of the sensor mounting portion 131. The magnetic sensor 180 protrudes radially outwardly, i.e. toward the bearing race 120, from the sensor support body 140. Since the sensor case 130 and the sensor support body 140 are located within the width of the bearing race 110, it is not necessary to support the sensor case 130 in the air with the sensor support body 140. This makes it possible to reduce the radial dimension of the sensor support body 140. That is, even though the sensor support body 140 is smaller in radial dimension, since the magnetic sensor 180 can be independently displaced radially outwardly toward the bearing race 120, it is possible to keep the magnetic sensor 180 sufficiently close to the encoder 150. It is possible to move the encoder closer to the magnetic sensor 180. But in this case, it is necessary to increase the radial dimension of the encoder toward the first bearing race over the entire circumference of the encoder.

The tubular sensor mounting portion 131 has its end that radially faces the bearing race 110 closed. The tubular sensor mounting portion 131 has a radial center axis. A circuit board carrying the magnetic sensor 180 is supported and kept in position by the inner wall surface of the sensor mounting portion 131. The wires 160 are connected to the circuit board. With the circuit board mounted in the sensor mounting portion 131, the radially inner open end of the sensor mounting portion 131 is closed by resin molding, forming a closure portion 132. The wires 160 extend through the closure portion 132 to outside of the sensor mounting portion 131. The closure portion 132 is radially protected by the sensor support body 140.

As shown in FIGS. 11(b) and 16, the sensor case 130 can be fitted in a circumferential portion of the sensor support body 140. The sensor case 130 has legs 134 protruding radially toward the bearing race 110 from respective wall portions 133 on both circumferential sides of the closure portion 132. The portions of the legs 134 protruding in the direction of the center axis of the tubular sensor mounting portion 131 (this axis is hereinafter referred to as the "tube center axis") from the respective wall portions 133 also extend in the opposite chord directions perpendicular to the tube center axis, away from each other. The wires 160 extend axially between the legs 134 of the sensor case 130. The wires 160 include circuit input and output lines of the magnetic sensor 180 and a detection signal line of the magnetic sensor 180, and are formed into a single cable.

The sensor support body 140 has a wire retaining groove 147 which radially aligns with the closure portion 132 of the sensor mounting portion 131 when the sensor case 130 is fitted in the sensor support body 140, and recesses 148 in which the wall portions 133 and the legs 134 are received when the sensor case 130 is fitted into the sensor support body 140 in the above-mentioned first axial direction. When the sensor case 130 is fitted in the sensor support body 140, the legs 134 are sandwiched by the walls of the respective recesses 148 in the direction of the tube center axis. The sensor case 130 is thus radially positioned. The wall portions 133 are sandwiched between the walls of the recesses 148 in the circumferential direction. The sensor case 130 is thus positioned in the circumferential direction too. When the sensor case 130 is inserted into the sensor support body 140, the side walls of the wire retaining groove 47 gradually axially move into between the legs 134, thus keeping the distance between the legs 134 in the above-mentioned chord direction. When the legs 134 abut the axially inner closed ends of the respective recesses 148, the sensor case 130 is positioned relative to the sensor support body 140 where the magnetic sensor 180 is held in the detecting position. This position is hereinafter referred to as the "fitted position". The surfaces of the recesses 148 and the wire retaining groove 147 serve as slide contact surfaces which guide the sensor case 130 in the first axial direction to the fitted position.

When the sensor case 130 is in the fitted position, the side walls of the wire retaining groove 147 radially support the closure portion 132 of the sensor mounting portion 131. Even if the sensor mounting portion 131 is pushed toward the bearing race 110, the side walls of the wire retaining groove 147 prevent the sensor mounting portion 131 from being actually moved toward the bearing race 110. As shown in FIG. 12, the axially inner walls of the recesses 148 support the radially inner tubular edge of the sensor mounting portion 131. Thus radially inward pressure does not concentrate on the closure portion 132.

When the sensor holder 130 is inserted into the sensor support body 140, the wires 160 are spontaneously bent to extend in the axial direction by contact with the walls of the recesses 148, and the legs 134 restrict the movement of the wires 160 in the chord direction. Thus, when the sensor holder 130 is inserted into the sensor support body 140, the wires 160 are spontaneously guided into the wire retaining groove 147.

As described above, the side walls of the wire retaining groove 147 keep the distance between the legs 134 in the chord direction, thus preventing movement of the sensor mounting portion 131, especially its movement toward the bearing race 120 due to the legs 134 moving toward each other.

The walls of the recesses 148 circumferentially sandwich the closure portion 132 and the wall portions 133, of the sensor mounting portion 131, thus preventing deformation of the inner wall surface of the sensor mounting portion 131, which keeps the magnetic sensor 180 in position, and also rigidly keeping the sensor mounting portion 131 in position in the circumferential direction.

As shown in FIGS. 11(*a*), 11(*b*) and 16, the springs 200 are each a leaf spring formed from a single metal sheet and having first hooks 201 and a second hook 202 provided independently of the first hooks 201. The first hooks 201 are formed by forming two axially extending parallel slits in a flat portion 203 and bending the strips defined by the respective slits laterally outside of the slits in the same direction. The second hook 202 is formed by bending the strip defined between the parallel slits in the same direction as the first hook 201 and further bending its distal end toward the flat portion 203. The legs 134 of the sensor case 130 have grooves 135 in the portions of the legs 134 protruding in the chord direction, respectively. The springs 200 can be pushed into the respective grooves 135 until the springs 200 are held in position in the respective grooves 135 and thus in the sensor holder 130. The grooves 135 extend in the axial direction, and are each defined by an axially inner closed end wall, a bottom surface and side walls. The axially inner closed end wall, bottom surface and side walls of each groove 135 support the flat portion 203 of the spring 200 which has been inserted into the groove, keeping the spring 200 in position with the first hooks 201 of the spring 200 press-fitted between the top and bottom surfaces of the groove 135, and the second hook 202 of the spring 200 inserted in a slit formed in the top wall of the groove 135. With the first hooks 201 pressed against the top surface of the groove 135, the spring 200 is held in position in the sensor holder 130. As shown by the two-dot chain line in FIG. 11(*a*), in the unstressed state, the second hook 200 of each spring 200 is configured to protrude from the slit formed in the top wall of the groove 135 in the direction of the tube center axis with the spring 200 mounted in the groove 135.

When the sensor case is fitted into the sensor support base and thus the legs 134 are inserted into the respective recesses 148, the second hook 202 of each spring is elastically deformed toward the flat portion 203 by contact with the wall of the recess 148, so that elastic restoring force is stored in the second hook 203. When the first hook 202 is elastically deformed, the spring 200 itself never moves because the first hooks 201 are press-fitted in the groove 135. In the fitted position, as shown by solid line in FIG. 11(*a*), the second hooks 202 of the respective springs 200 are elastically pressed against the top surface of the respective recesses 148, while being kept out of contact with the flat portions 203. Thus, the sensor case 130 is fixed to the sensor support base 140 through the springs so as not to be movable in the second axial direction. Since the second hooks 202 are also received in the respective recesses 148, the recesses 148 prevent the hooks 201 and 202 from being hit by any unexpected object. Since the springs 200 act on the legs 134, which protrude from the closure portion 132 of the sensor mounting portion 131, deformation of the sensor mounting portion 131 is avoided.

With the sensor case 130 fitted in position in the sensor support body 140 by the springs 200, spaces remain in the respective recesses 148 where the second hooks 202 have passed when the sensor case has been fitted into the sensor support body. Since the second hooks 202 are spaced from the respective flat portions 203 in this state, by inserting e.g. rods into the above respective spaces, it is possible to axially push the second hooks 202, thereby elastically deforming the second hooks 202 toward the flat portions 203, and separating the second hooks 202 from the surfaces of the recesses 148. The sensor case 130 can thus be pulled out of the recesses 148 in this state.

In the sixth embodiment too, if creeping of the bearing race 110 is a concern, the external member 170 may be used to rotationally fix only the sensor support body 140 to the stationary member as shown in FIG. 12. If the bearing race 110 creeps, since the sensor support body 140 is prevented from rotating by the external member 170, the sensor support body 140 slips in the circumferential direction relative to the peripheral surface 111 formed with the raceway by a distance corresponding to the creep distance. This prevents the wires 160, which are connected to an external device, from being pulled in the circumferential direction and broken even if the bearing race 110 creeps. Thus, even if the bearing has to be replaced with a new one due to the problem of creeping, the wires 160 can be used continuously.

Also, if the bearing has to be replaced with a new one due to the problem of creeping, since the recesses 148 and the second hooks 202 are exposed axially outwardly between the radially inner surface of the inner race 110 and the radially outer surface of the outer race 120, it is possible to dismount the sensor case 130 by elastically deforming the springs 200 in the above manner with the inner and outer races 110 and 120 still mounted to the rotary shaft (not shown) and the housing (not shown), respectively. This prevents possible damage to the sensor case 130, which is to be used continuously, when the bearing is later dismounted.

Since the sensor case is simply guided into the fitted position and fixed in this position by the springs, when the sensor case 130 is dismounted, no damage remains on the surface of the sensor case 130, such as when an adhesive is peeled off the sensor case 130. Thus, after the sensor case 130 has been dismounted from one bearing assembly, it can be fitted into the sensor support body 140 of another bearing assembly as it is.

As shown in FIGS. 13(a) and 13(b), the sensor support base 140 has two of the wire retaining grooves 147 formed in the respective split halves 141. Two of the above-described sensor cases 130 are fitted at the positions corresponding to the respective wire retaining grooves 147. Since the two sensor cases 130 are used, even if the magnetic sensor 180 of one of the sensor cases 130 malfunctions, the sensor of the other sensor case can detect rotation.

Figure 17B:
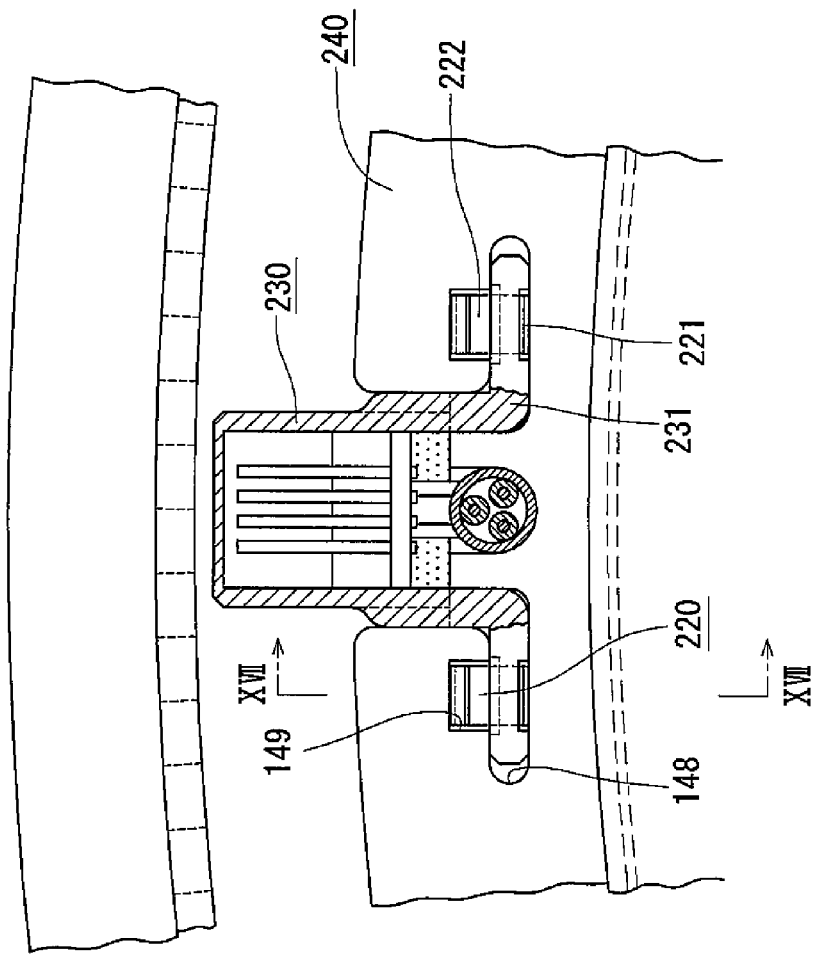
FIG. 17(b) is a partially cutaway enlarged front view of a portion of a seventh embodiment.
Figure 17A:
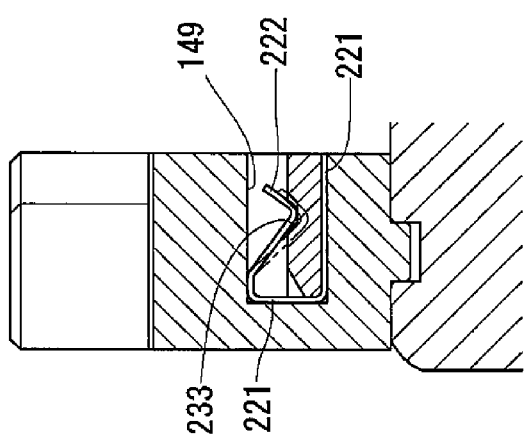
FIG. 17(a) is a sectional view taken along line XVII-XVII of FIG. 17(b)

Description is now made of the seventh embodiment, mainly what differs from the sixth embodiment, with reference to FIGS. 17(a), 17(b) and 18, and what has already been described is not repeated here. As shown, the seventh embodiment differs from the sixth embodiment in that the springs 220 engage the respective legs 231 of the sensor case 230 and are fitted in the sensor support body 240.

In particular, the sensor support body 240 has spring receiving recesses 149 in which the respective springs 220 are configured to be mounted. The spring receiving recesses 149 each include a recess 148 similar to the recess 148 of the sixth embodiment, and an axial groove. The recess 148 is recessed in the direction of the tube center axis and sandwiches the leg 231 in the direction of the tube center axis. The springs 220 each include a fitted portion 221 restricted by the spring receiving recess 149 and a free end portion 222 extending from the fitted portion 221 into the air. When the spring 220 is pressed axially into the spring receiving recess 149 until the fitted portion 221 abuts the axial end of the recess 149, the fitted portion 221, which is hook-shaped, is stably seated in position. In this state, as shown by two-dot chain line in FIG. 17(a), the free end portion 222 is spaced from both the wall surface of the spring receiving recess 149 and the fitted portion 221 in the direction of the tube center axis.

The legs 231 of the sensor case 230 each have a leading portion 232 which first enters the space between the fitted portion 221 and the free end portion 222 of the spring 220 fitted in the recess 149, when the sensor case 230 fitted into the sensor support body 240, and an engaging portion 233 provided in the rear of the leading portion 232 with respect to the direction in which the sensor case is fitted into the sensor support body. The engaging portion 233 is recessed in the direction of the tube center axis from the leading portion 232. When the sensor case is fitted into the sensor support body, the free end portion 222 is elastically deformed to store an elastic restoring force by contact with the leading portion 232, and then engages in the engaging portion 233 as shown by solid line in FIG. 17(a). In this state, the free end portion 222 biases the engaging portion 233 toward the fitted position. Thus, the sensor case 230 is fixed to the sensor support base 240 through the springs 220 so as not to be movable in the second axial direction. Since the free end portions 222 of the springs engage the respective engaging portions 233 in the spring receiving recesses 149, the spring receiving recesses 149 prevent the free end portions 222 from being hit by any unexpected object. The legs 231 each have an axial groove on its surface opposite to the surface formed with the engaging portion 233 through which the fitted portion 221 of the spring is passed.

The distal end of the free end portion 222 is spaced from the wall surface of the spring receiving recess 149 in the direction of the tube center axis, and the free end portion 222 is bent such that its distal end protrudes from the engaging portion 233 in the direction of the tube center axis. With the sensor case fitted in position, spaces remain in the respective spring receiving recesses 149 where the free end portions 222 have passed when the sensor case has been fitted into the sensor support body. Thus, by inserting e.g. rods into the above respective spaces, it is possible to axially push the tips of the free end portions 222, thereby elastically deforming the free end portions 222 so as to separate from the engaging portions 233. The sensor case can thus be uncoupled from the sensor support base.

In the seventh embodiment, since the springs 220 are not fitted in the sensor case 230, it is not necessary to form grooves in the form of undercuts with respect to the direction of the tube center axis, as in the sixth embodiment. Thus, the sensor case of the seventh embodiment can be formed using a mold including two mold halves that can be separated in the direction of the tube center axis.

Figure 19:
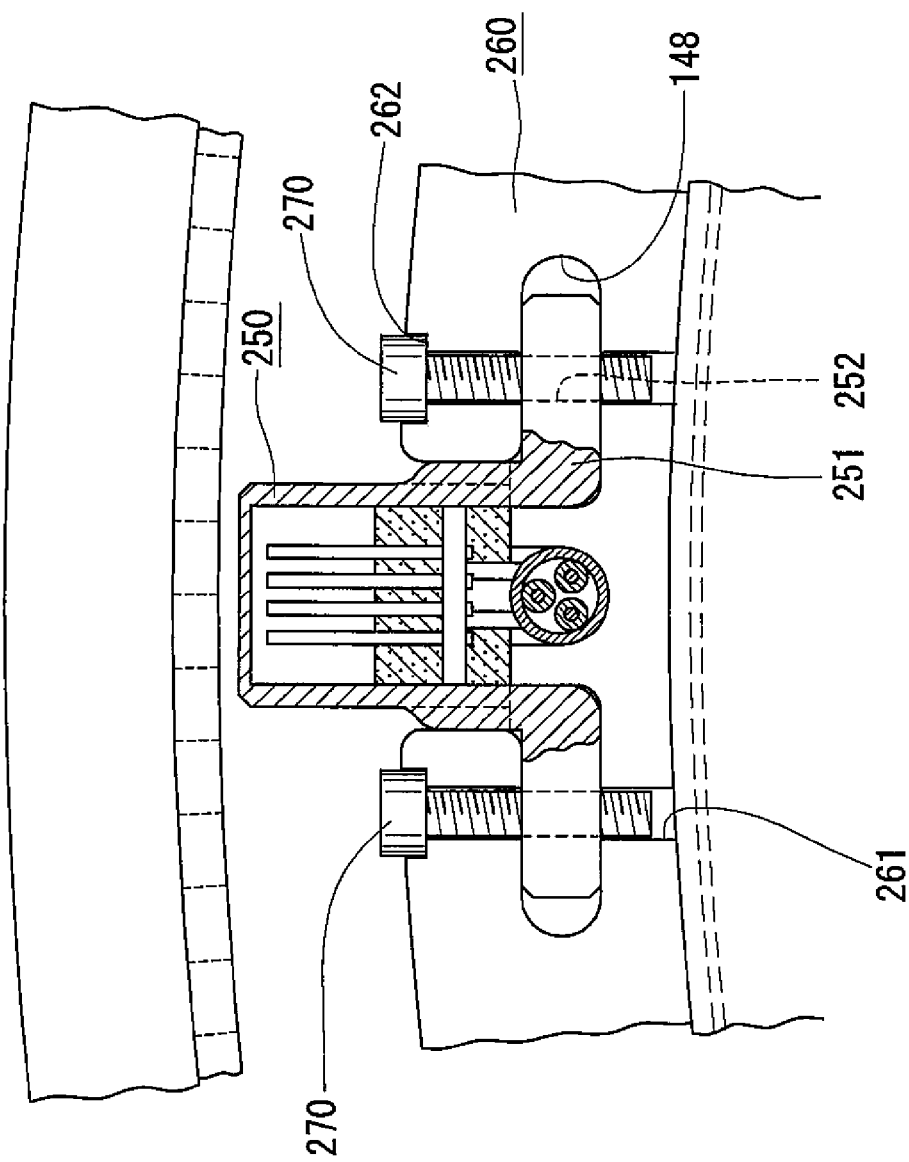
FIG. 19 is a partially cutaway enlarged front view of a portion of an eighth embodiment.

FIG. 19 shows the eighth embodiment. As shown, the eighth embodiment differs from the sixth and seventh embodiments in that instead of by means of the springs, the sensor case 250 is fixed to the sensor support body 260 in the fitted position by tightening threaded members 270 and uncoupled from the sensor support body by turning and pulling out the threaded members 270. The threaded members 270 are passed through holes 252 formed in the respective legs 251 and driven into threaded hole s 261 formed in walls of the recesses 148, thus coupling the legs 251 to the recesses 148 in the direction of the tube center axis in the same manner as in the sixth and seventh embodiments.

The present invention is not limited to the above-described embodiments and encompasses each and any modification that is within the scope of the claims. For example, the present invention encompasses an arrangement in which the above-described mounting structure, which includes the annular sensor holder having circumferential ends, engaging member, guide member, etc., is used for a bearing assembly of which the inner race is the above-mentioned first bearing race, and the stationary member is a shaft member fitted in the inner race. In the arrangement in which the outer race is the first bearing race and the bearing assembly is mounted between one end of the rotary member and the stationary member, since it is not necessary to form a shaft inserting hole in the engaging member, a lid member may be used as the engaging member. By omitting the shaft inserting hole, it is possible to prevent entry of foreign matter into the bearing assembly. When coupling the sensor holder to the stationary member with wires connected to the magnetic sensor, if the wires are in the way when fitting the engaging member, the engaging member may be coupled to the stationary member by threaded members only as in the first embodiment.

Also, the arrangement disclosed in JP Patent Applications 2007-91926 and 2007-73951 may be used, in which the sensor support body is an annular member having circumferential ends and having a protrusion which can be fitted in a circumferential groove formed in the peripheral surface of the outer race formed with the raceway by radially compressing the sensor support body, and in which a spacer member is provided between the circumferential ends of the sensor support body to restrict radial compression of the sensor support body, thereby keeping the protrusion fitted in the circumferential groove. In this case, the encoder is rotationally fixed to the inner race. If a rubber magnet is used as the encoder, its core bar may be provided close to the first bearing race with the magnetized surface of the rubber magnet facing axially so that the encoders radially faces the magnetic sensor.

What is claimed is:

1. A bearing assembly with a rotation sensor, comprising:
    a rolling bearing including an inner race and an outer race, an annular sensor holder, and a magnetic sensor supported by the sensor holder,
    wherein the sensor holder can be fitted to one of the inner and outer races,
    wherein with the rolling bearing mounted between a stationary member and a rotary member, the sensor holder mounted to the one of the inner and outer races, and a signal from the magnetic sensor entered into an external device through wires extending from the sensor holder to the external device, detection is made by the magnetic sensor and an encoder rotationally fixed to the other of the inner and outer races so as to rotate in unison with the other of the inner and outer races,
    wherein the sensor holder is mounted to the one of the inner and outer races so as to be in contact with and slideable relative to the one of the inner and outer races in a circumferential direction of the rolling bearing,
    wherein the one of the inner and outer races is fitted to the stationary member,
    wherein the bearing assembly further comprises a fixing arrangement through which the sensor holder is coupled to the stationary member such that when fitting surfaces of the stationary member and the one of the inner and outer races rotate relative to each other, the sensor holder is circumferentially fixed with respect to the stationary member but slides in the circumferential direction relative to the one of the inner and outer races in the event of creep between the stationary member and the one of the inner and outer races,
    wherein the one of the inner and outer races is formed with a circumferential groove extending along an entire circumference of the one of the inner and outer races,
    wherein the sensor holder has two circumferential ends circumferentially facing each other, and
    wherein the sensor holder has a protrusion at a first axial end of the sensor holder, the protrusion being engageable in the circumferential groove by elastically deforming the sensor holder such that the size of a gap defined between the circumferential ends of the sensor holder changes in the circumferential direction.

2. The bearing assembly of claim 1, wherein the sensor holder can be coupled to the stationary member by the fixing arrangement at two portions of the sensor holder which are nearer to the respective circumferential ends of the sensor holder such that when the sensor holder is coupled to the stationary member at the two portions, a circumferential distance between the circumferential ends of the sensor holder is fixed.

3. The bearing assembly of claim 1, wherein the one of the inner and outer races has a first peripheral surface formed with a raceway, and the circumferential groove is one of two seal grooves formed on the first peripheral surface of the one of the inner and outer races.

4. The bearing assembly of claim 1, wherein the sensor holder includes a coupling portion, and wherein the fixing arrangement comprises at least one threaded member fastening the coupling portion to the stationary member in an axial direction of the rolling bearing.

5. The bearing assembly of claim 4, wherein the coupling portion protrudes from the sensor holder in a direction away from the one of the inner and outer races.

6. The bearing assembly of claim 4, wherein the coupling portion extends so as to axially overlap a side surface of the stationary member.

7. The bearing assembly of claim 1, wherein the fixing arrangement includes an engaging member extending diametrically between the stationary member and the sensor holder, wherein the sensor holder can be coupled to the stationary member through the engaging member, and
    wherein the engaging member includes a peripheral portion supporting a second axial end of the sensor holder protruding from the one of the inner and outer races in a radial direction of the rolling bearing, and a side portion supporting the second axial end of the sensor holder in an axial direction of the rolling bearing.

8. The bearing assembly of claim 7, wherein the sensor holder has first protrusions and recesses formed at the second axial end of the sensor holder, and wherein the engaging member has second protrusions and recesses which engage the first protrusions and recesses in the circumferential direction.

9. The bearing assembly of claim 1, wherein the fixing arrangement fixes the sensor holder to the stationary member.

10. The bearing assembly of claim 1, wherein the fixing arrangement fixes the sensor holder to the stationary member so that the sensor holder is both axially and circumferentially fixed to the stationary member.

* * * * *